United States Patent [19]

Potter et al.

[11] Patent Number: 5,014,327

[45] Date of Patent: May 7, 1991

[54] PARALLEL ASSOCIATIVE MEMORY HAVING IMPROVED SELECTION AND DECISION MECHANISMS FOR RECOGNIZING AND SORTING RELEVANT PATTERNS

[75] Inventors: Terry W. Potter, Acton; Glen C. Worrell, Auburn, both of Mass.

[73] Assignee: Digital Equipment Corporation, Maynard, Mass.

[21] Appl. No.: 156,542

[22] Filed: Feb. 16, 1988

Related U.S. Application Data

[63] Continuation-in-part of Ser. No. 62,473, Jun. 15, 1987, abandoned.

[51] Int. Cl.⁵ .................................................. G06K 9/62
[52] U.S. Cl. ........................................ 382/14; 382/30; 382/33; 382/34
[58] Field of Search ........................ 382/14, 30, 33, 34

[56] References Cited

U.S. PATENT DOCUMENTS

| | | | |
|---|---|---|---|
| 3,618,016 | 11/1971 | Steenis | 382/30 |
| 3,717,848 | 2/1973 | Irvin et al. | 382/30 |
| 3,737,852 | 6/1973 | Robinson | 382/34 |
| 3,806,890 | 4/1974 | Smith | 340/172.5 |
| 3,931,612 | 1/1976 | Stevens et al. | 340/172.5 |
| 4,030,077 | 6/1977 | Florence et al. | 340/172.5 |
| 4,031,520 | 6/1977 | Rohner | 364/200 |
| 4,084,260 | 4/1978 | Fleming et al. | 364/900 |
| 4,119,946 | 10/1978 | Taylor | 382/34 |
| 4,149,262 | 4/1979 | Lamb et al. | 364/900 |
| 4,326,259 | 4/1982 | Cooper et al. | 364/715 |
| 4,593,367 | 6/1986 | Slack et al. | 364/513 |
| 4,648,044 | 3/1987 | Hardy et al. | 364/513 |
| 4,670,848 | 6/1987 | Schramm | 364/513 |

OTHER PUBLICATIONS

Terry W. Potter, "Storing & Retrieving Data in a Parallel Distributed Memory System,"PhD Thesis, State University of N.Y., Binghamton, May 1, 1987.
Terry W. Potter, "Design of an Intelligent Memory Subsystem," PhD Thesis, pp. 153-157, State University of N.Y., Binghamton, N.Y. (May 1, 1989).
Sebesteyn, G. S., Decision-Making Processes in Pattern Recognition, McMillan Co., N.Y. (1962).
Loomis, Jr., "System Design of Vector I-A High Speed Data-Array Processor," Univ. of Calif. Engr. Rep. No. 120 (1970).
Digby, D. W., "A Search for Many-to-Many Comparisons," IEEE Trans. on Computers, vol. C-22, No. 8, Aug. 1973, pp. 768-772.
Marvel, O. E., "HAPPE Honewell Associative Processing Ensemble," Proceedings of the First Annual Symposium on Computer Architecture, University of Florida, Dec. 9-11, 1983, pp. 261-267.
Smith & Wittie, "Memory Hardware for High-Speed Job Selection," IEEE Trans. on Computers, vol. C-25, No. 2, Feb. 1976, pp. 148-156.
Batchelor, G. B., Practical Approach to Pattern Classification, Plenum Press (1974), pp. 35-122.

Primary Examiner—David K. Moore
Assistant Examiner—Jose L. Couso
Attorney, Agent, or Firm—Arnold, White & Durkee

[57] ABSTRACT

A parallel associative memory provides a way of recognizing or identifying observed data patterns. Each of a plurality of memories stores a plurality of recognition patterns. In response to receipt of a recall pattern to be identified, the recall pattern is contemporaneously compared to the recognition patterns stored in the memories and an exact or best match recognition pattern is selected. In a preferred embodiment, the memories may store multiple data bases each of which includes patterns having different lengths and different radii of attraction. The comparison process is controlled by masks which specify respective portions of the patterns which may include the radii of attraction, bits which must identically match, bits which are ignored, bits which are compared in a bit-wise fashion, and bytes which are compared by multiplication. A correlation is computed and selectively adjusted by the respective radii of attraction. A specified number of the patterns having the best correlation are identified, subject to selected threshold conditions, and sorted according to their respective correlations. The parallel nature of the memory lends itself to a hierarchical organization for increased storage capacity and to parallel processing which increases the speed of the identification or recognition process and thereby allows a broad range of applications. These applications includes fast retrieval of exact or inexact data, diagnosis, image processing and speech recognition.

24 Claims, 20 Drawing Sheets

| RAM ADDRESS | BANK 0 | BANK 1 | BANK 2 |
|---|---|---|---|
| 0 | LIW( 0) (LENGTH IN WORDS = L0) | | |
| 1 ⋮ L0 | PAT(0, 0) ⋮ | PAT(1, 0) ⋮ | PAT(2, 0) ⋮ |
| L0+1 ⋮ | MORE PATTERNS ⋮ | MORE PATTERNS ⋮ | MORE PATTERNS ⋮ |
| aℓ | LIW( nℓ) (LENGTH IN WORDS = L1) | | |
| aℓ+1 ⋮ aℓ+L0 | PAT(0, nℓ) ⋮ | PAT(1, nℓ) ⋮ | PAT(2, nℓ) ⋮ |
| aℓ+L0+1 | MORE PATTERNS AND LIWS ⋮ | MORE PATTERNS ⋮ | MORE PATTERNS ⋮ |
| | LIW( END) | | |
| | ⋮ | ⋮ | ⋮ |
| 256K-1 | | | |

STORAGE WORD DETAIL

```
WORD          BIT
              31 30 29 28 27 26 ... 17 16 15 ... 5 4 3 2 1 0
```

PAT-WORD 0 ANY BANK: | d31 -------------------------------- d1 | UF |

UF : USED FLAG - a LOGICAL 1 INDICATES VALID DATA
dn : PATTERN DATA INCLUDING HEADER

PAT-WORD 0 BANK 0: | ........................ | LF | 0 |

0 : UF IS A LOGICAL 0
LF : LIW FLAG - a LOGICAL 0 SPECIFIES a LIW a LOGICAL 1 INDICATES THAT BANKS 1 AND 2 CONTAIN VALID DATA

LIW-BANK 0: | L10 ----- L0 | | EF | 0 | 0 |

0 : UF AND LF ARE LOGICAL 0s SPECIFYING a LIW
EF : END OF DATA BASE FLAG - a LOGICAL 0 MARKS THE END OF THE DATA BASE
L10...L0 : LENGTH OF FOLLOWING PATTERN SLOTS

LIW-BANK 1: | m31 -------------------------------- m0 | m31..m0 : REMAINDER MASK. 0s INDICATE VALID DATA. 1s CAUSE DATA TO BE IGNORED

LIW-BANK 2: | | fig. 7.

| IGNORE MASK BIT | SUBSPACE MASK BIT | COMPARISON OPERATION |
|---|---|---|
| 0 | 0 | DECREMENT SUM IF BIT MISMATCH BETWEEN KEY AND PATTERN |
| 0 | 1 | REJECT PATTERN IF BIT MISMATCH BETWEEN KEY AND PATTERN |
| 1 | 0 | DO NOTHING IF BIT MISMATCH BETWEEN KEY AND PATTERN |
| $I_0 = 1$ | $S_0 = 1$ | SPECIAL OPERATION - E.G. MULTIPLY BYTE, OR SKIP SUBSPACE MATCH |

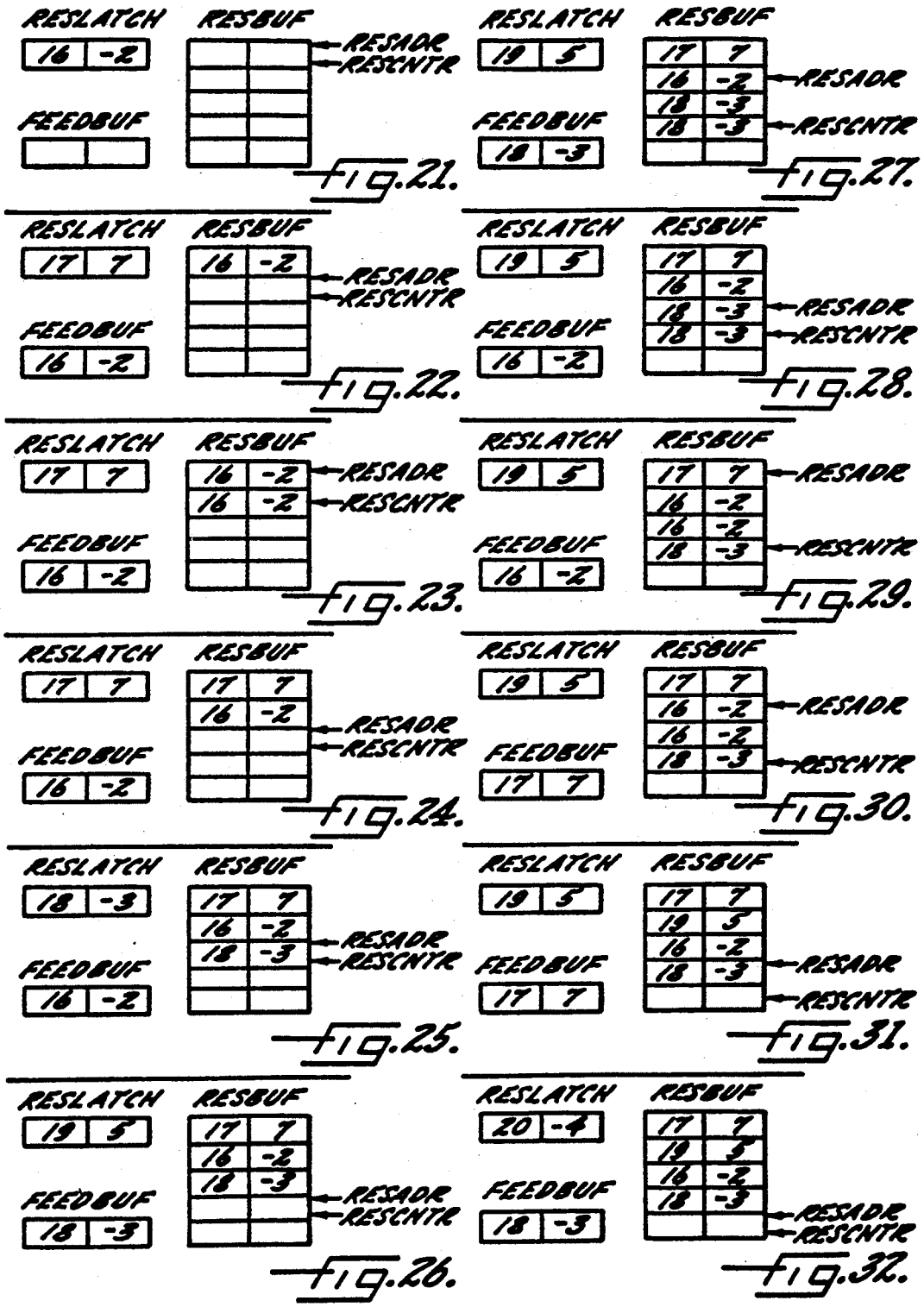

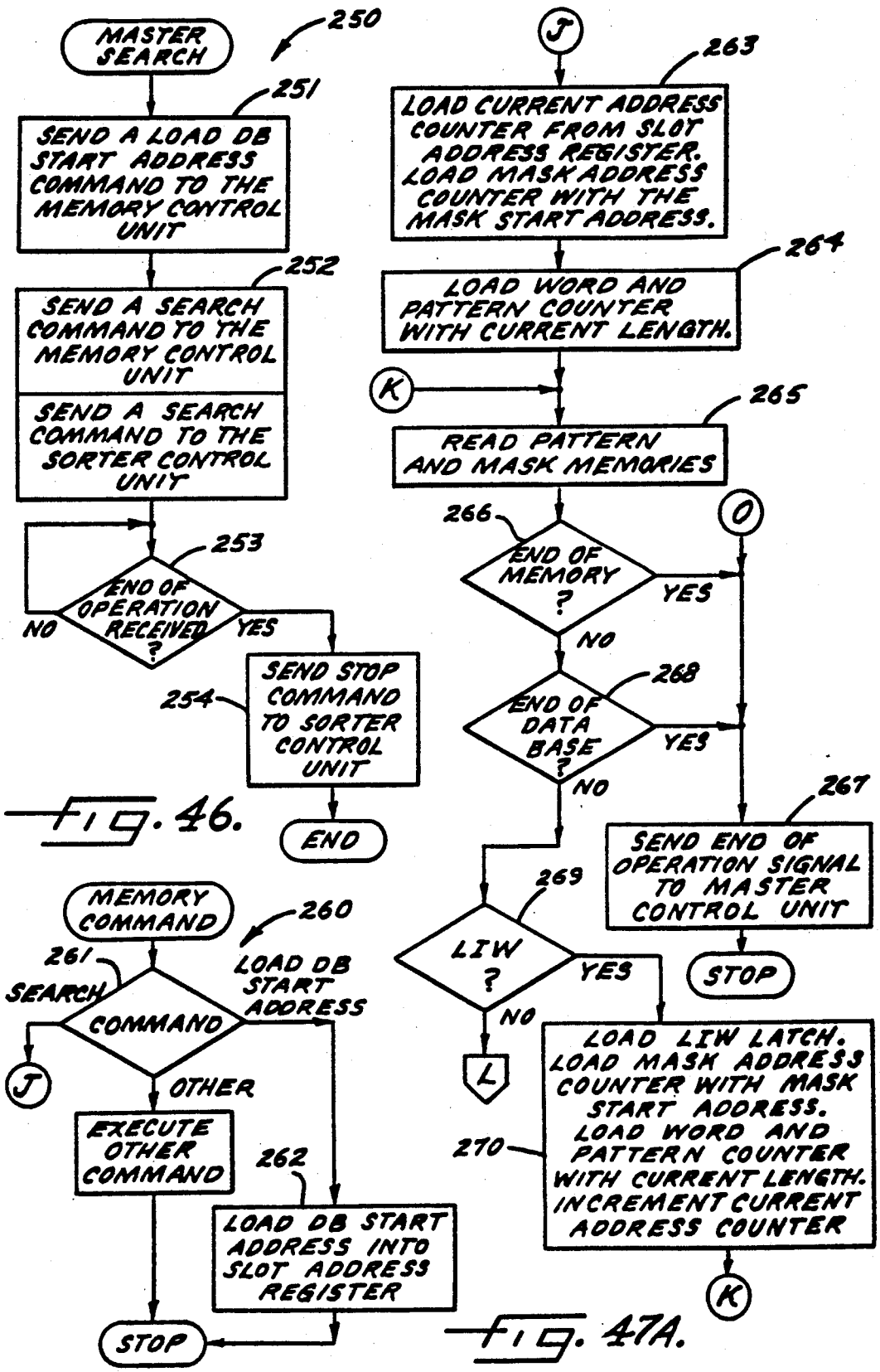

PARALLEL ASSOCIATIVE MEMORY HAVING IMPROVED SELECTION AND DECISION MECHANISMS FOR RECOGNIZING AND SORTING RELEVANT PATTERNS

RELATED APPLICATIONS

The present application is a continuation-in-part of U.S. application Ser. No. 062,473 filed June 15, 1987, now abandoned.

BACKGROUND OF THE INVENTION

1. Field of the Invention

The present invention relates to a parallel associative memory. Such a parallel associative memory can be used in systems for data retrieval or for pattern recognition by selecting one or more stored patterns that best match an input pattern. In particular, the present invention relates to a memory which stores a large number of patterns and carries out the selection operation in a parallel manner. The parallel nature of the memory increases the operational speed and efficiency of the memory. The increased speed broadens the field of the memory's application.

2. Description of Related Art

In an associative memory, a data pattern is compared to a plurality of stored patterns and an exact match is sought. The pattern acts as an address to an additional portion of the memory where information relating to the stored pattern is stored. The result is the retrieval of data associated with the data pattern.

In pattern recognition systems, a plurality of known patterns are stored in a storage medium and unidentified observed patterns are compared to those plurality of known patterns that are stored. If an unidentified observed pattern matches one of the stored patterns then an identification occurs. If there is no exact match for the unidentified observed pattern then the recognition system is usually required to find the "best" match for the unidentified observed pattern from the stored patterns. The recognition system usually employs similarity measures or distance measures to determine the "best" match. The identification of the unidentified observed pattern with an exact match or the selection of a "best match" associates the observed pattern with a label or a class identification that corresponds to the label or class identification of the exact or "best" match of the observed pattern.

Associative memories and pattern recognition systems have the following potential applications. The systems and memories can be used in module diagnosis where it is desired to determine a particular fault that is associated with a particular failure of a board of a module. A second potential application is in optical character recognition. In optical character recognition one desires to quickly recognize particular characters from existing character fonts in order to input an entire page of text through a scanner and in order to be able to later edit this same page. A third potential application is for speech recognition where one desires to quickly associate a sound pattern to particular phonics in a manner that is independent of the speaker of the sound pattern. A fourth potential application is in chemical or biological laboratory situations. In these situations it may be desired to identify a chemical from some particular measurements or to identify a virus from some blood or tissue samples for example. A fifth potential application is in Data Base systems. In these systems it is desired to recall useful information even when a recall key is in error. These are all possible applications for a recognition system or an associative memory, however this is not an exhaustive list of potential applications.

Prior associative memories and pattern recognition systems consist of either general purpose processors, which are slow when used for pattern recognition, or very fast special purpose processors which are only capable of use in a narrow set of applications. Moreover, associative memories generally are designed for fixed size patterns, perform exact matching, have limited storage capacity and are fairly expensive.

In many of the above-identified applications there are many possible patterns which can be used to represent a particular classification with which an observed pattern may be associated. The number of known patterns necessary for identification of an unidentified pattern determines the storage requirement of the system or memory. In order to reduce the potential storage requirement, it is necessary to attempt to determine one or more "typical" patterns that are representative of the available classifications. This can be done using parametric statistical techniques (if large samples of representative patterns have been collected) or by non-parametric approaches (applicable when only small samples of representative patterns are available). The procedures that attempt to find "typical" patterns are really procedures that divide or partition the known patterns into groups or classes. The partitioning process has been studied extensively in the literature under various topics including Pattern Recognition, Cluster Analysis, Decision Theory, Neural Networks, and Parametric and Non-Parametric Statistics.

Once "typical" patterns are selected, these "typical" patterns can represent groups or classes of other similar patterns. Ideally classes are disjoint. The ability to label a group of patterns is an important task in associative memory and pattern recognition applications. As an example, a pattern which was observed but not previously identified as belonging to a particular class and is similar to a group of already stored patterns can be identified as belonging to that particular group or class of patterns.

The process of identifying an observed pattern or retrieving data associated with a pattern and associating it with a particular class or group of patterns can be broken down into two stages, a first stage called the storage or partition stage and a second stage called the recall or recognition/classification stage.

In the storage or partitioning stage, data is collected by obtaining observed patterns. The data is manipulated to get pattern features into a desired form for pattern recognition. Then, "typical" patterns are selected in accordance with a particular partitioning algorithm. This algorithm may be as simple as using the first pattern in each pattern class or group as the "typical" pattern or it may be as complex as using an averaging procedure for identifying a "typical" pattern from the plurality of patterns associated with a given class or group of patterns. Once the "typical" patterns are selected the second stage of the identification process can be initiated.

In the recall stage (for data retrieval) or recognition/classification stage, an unidentified observed pattern is obtained. This unidentified observed pattern is then compared against the "typical" patterns which have been produced in the storage or partitioning stage.

Based upon the comparison of the unidentified observed pattern to these "typical" patterns, a nearest pattern class to which this observed pattern belongs or the k nearest pattern classes can be identified.

There are a large number of procedures for selecting "typical" patterns and for partitioning the pattern space. A large number of these procedures use an Euclidian measure of distance which can be shown to be similar to a Hamming distance. Hamming distance is a common metric distance in the field of pattern recognition.

The problem with most of these pattern recognition systems and associative memories is the extent of the computational efforts involved in identifying an observed pattern. The most significant aspect of these computational efforts involves the amount of effort required for obtaining the distance measurements. These can be broken down into three major areas that consume time and effort. The first major area is obtaining the "typical" patterns representative of the various classes or groups of patterns. The second major area is the partitioning of the typical patterns for storage. A third major area is the actual recalling or recognition process.

An example of a prior pattern recognition system is disclosed in U.S. Pat. No. 4,326,259 entitled "Self Organizing General Pattern Class Separator and Identifier" by Leon Cooper. This system has limited capabilities as its implementation in hardware would be limited to a particular adaptive recognition algorithm which the system supports.

A threshold or radius of attraction has been used for deciding whether an observed pattern is a member of a predefined class. G. S. Sebestyen published adaptive pattern recognition algorithms in 1962 and the algorithms used the concept of class thresholds. See G. S. Sebestyen, *Decision-Making Processes in Pattern Recognition*, The Macmillian Company, New York (1962).

In chapter 4 of Sebestyen's book, he describes several approximate and adaptive techniques of classification which are said to inherently result in rapid processing and updating of input information. A simple algorithm for constructing decision regions is introduced in which the region is constructed by storing representative samples of the classes. Classification of a new input is based on distance to the nearest stored sample. An input is said to belong to class A because it is closer to at least one typical member of class A than to any of the typical members of class B. In a refinement of this method described on pages 97-98, a finite number of given samples are used in a decision procedure that approximates a likelihood ratio computation, since it bases decisions on a local majority rule; an input is said to belong to A if, within a radius r, more A than B type samples were observed in the past.

Sebestyen further describes a number of machines that represent and store knowledge about classes by selectively sampling the set of known members. The selected samples are distributed in the same way as the set of known members and they cover the same region of the vector space. Classificatory decisions are based on the distance of the input to the closest elected sample. It is said that this procedure is inherently fast and can be readily implemented by a machine that performs sequential comparisons with stored samples. An adaptive technique of performing selective sampling is described that uses input information as it occurs and as it is influenced by the new sample, it updates the stored information concerning the nature of the decision regions. A cascaded or multilayered machine is also described in which learned concepts are introduced as new dimensions of the pattern space.

On pages 119-121 Sebestyen discloses that an often used procedure in pattern recognition is to correlate an input vector to be classified with each of several stored references that represent the different classes to which the input may belong. The stored references are often the means of the set of samples of the different classes. Decisions are made by comparing the correlation between the input and each of the stored references and by deciding that the input is a member of the class corresponding to the largest correlation coefficient. Another method of making classifications is based on a comparison of the Euclidian distance between the input and the stored references. Although decisions based on maximum correlation and minimum Euclidian distance are very similar, the similarity ceases when thresholds are used to avoid decision making in uncertain cases.

The prior pattern recognition systems fail to provide the combined advantages of speed and flexibility.

SUMMARY OF THE INVENTION

The primary object of the present invention is to provide an associative memory which operates at a high speed and has a broad field of applicability.

A further object of the present invention is to provide a recall or recognition system in which a plurality of recognition operations are carried out in parallel.

Another object of the present invention is to provide a parallel architecture for an associative memory which allows the easy addition of storage capacity or the further reduction of search time by increasing parallelism.

Yet another object of the present invention to provide a recall or recognition system in which the searching or matching operation is carried out by a first lower tier while adaptive partitioning is implemented by an upper tier which can be application-specific.

The above and further objects of the present invention are achieved by a parallel associative memory, comprising: means for receiving a recall pattern; a plurality of addressable memory means for storing and recalling a plurality of recognition patterns at respective addresses; means for addressing said addressable memory means to contemporaneously recall a sequence of said stored recognition patterns from each of said addressable memory means; means for contemporaneously comparing said recall pattern to the recognition patterns recalled from each of said addressable memory means; means for selecting at least one recognition pattern that closely matches said recall pattern based upon the comparison by said means for comparing; and means for outputting an indication of at least one recognition pattern selected by said means for selecting.

The present invention is preferably organized in a hierarchical fashion. In this case the parallel associative memory comprises: means for inputting a recall pattern; and a plurality of associative memories, each of which comprises: means for receiving said recall pattern from said means for inputting, means for storing a plurality of recognition patterns, and means for outputting at least one recognition pattern that closely matches said recall pattern from said plurality of recognition patterns in said means for storing. In this case the parallel associative memory further comprises: means for selecting at least one recognition pattern that most closely corresponds to said recall pattern from the outputs of said plurality of modified memories; and means for outputting said at least one recognition pattern selected by said means for selecting. The means for receiving the recall pattern in each of the associative memories may receive the recall pattern nearly simultaneously and the plurality of modified memories may operate contemporaneously to produce respective outputs through said means for outputting of the modified memories. The associative memories may also comprise means for comparing the recall pattern, from said means for receiving, to the plurality of recognition patterns in the means for storing. The associative memories may further comprise a means for selecting recognition patterns that closely match the recall pattern, based upon a comparison by said means for comparing, as the output of said means for outputting of the modified memory.

The means for comparing may compare the recall pattern to each of the plurality of recognition patterns in a bit-wise fashion and then the means for selecting chooses, as the recognition patterns that closely match the recall pattern, the recognition patterns whose bit-wise comparisons with the recall pattern result in the fewest differences. Moreover, there may be provided means for monitoring the number of differences in the bit-wise comparison of the recall pattern to a given recognition pattern. Further comparison of the recall pattern to the given recognition pattern may be halted when the number of differences exceeds a predetermined threshold.

The parallel associative memory preferably includes additional means which provide great flexibility for the recognition of patterns having a variety of attributes. For a given application domain, the attributes of the recognition patterns to be stored in the memory can match the attributes of the data from the application domain. Therefore, the manipulation, partitioning and storage of the data are greatly facilitated, and usually the data are stored in a more compact form. The speed of identifying an observed pattern is increased by the reduced amount of memory space that needs to be searched, and also by performing comparison and selecting operations that are based upon the particular attributes of the data.

The attributes of the recognition patterns may include various lengths and radii of attraction for the respective recognition patterns, and characteristics of specified portions of the recognition patterns. The characteristics include portions to be ignored, portions which must identically match corresponding portions of the recall pattern, portions which are compared in a bit-wise fashion by accumulating the number of bit differences, and portions which are compared in a multi-bit or byte-wise fashion by multiplying and accumulating the products. The specified portions and their characteristics are designated by masks.

The parallel associative memory of the present invention provides an architecture which allows one to easily add storage capacity to the memory or further reduce search time by increasing parallelism. The storage capacity can be provided by conventional random access memories logically organized in parallel. This is a very inexpensive implementation based upon the use of off-the-shelf primary logical components. Alternatively, the present invention could be integrated into the individual random access memory chips. The parallel nature of the memory and the ability to add further storage capabilities results in a parallel associative memory which can recognize patterns in a faster manner than general purpose processors without an overly burdensome narrowing of the field of application for which the parallel associative memory can be used.

BRIEF DESCRIPTION OF THE DRAWINGS

Other objects and advantages of the invention will become apparent upon reading the detailed description and upon reference to the drawings, in which:

FIG. 6 is a diagram illustrating a data base configuration for the third embodiment of the present invention illustrated in FIG. 5;

FIG. 7 is a diagram illustrating data word formats for the data base configuration of FIG. 6;

FIGS. 21–44 show a specific example of the operation of the sorter of FIG. 18 according to the flowchart in FIG. 20;

FIG. 46 is a flowchart of a master control sequence for performing a search operation; and FIGS. 47A and 47B together comprise a flowchart defining control logic used for addressing the data base memory of FIG. 14 and operating the accumulator circuits of FIG. 15.

Figure 1:
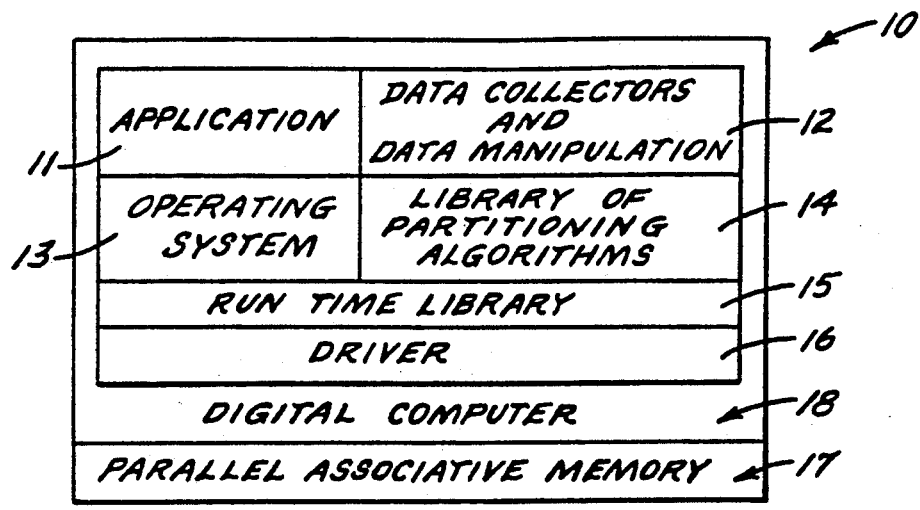
FIG. 1 is a block diagram of a recognition or matching system in which a parallel associative memory of the present invention is used.

While the invention is susceptible to various modifications and alternative forms, certain preferred embodiments have been shown by way of example in the drawings and will be described in detail. It should be understood, however, that it is not intended to limit the invention to the particular forms disclosed, but on the contrary, the intention is to cover all modifications, equivalents and alternatives falling within the spirit and scope of the invention as defined by the appended claims.

DESCRIPTION OF THE PREFERRED EMBODIMENTS

FIG. 1 illustrates a system 10 that performs pattern recognition (pattern matching) by using a parallel associative memory of the present invention. The Application 11 and the Data Collectors and Data Manipulation portions 12 are dependent upon the particular application for the overall recognition system 10. The Application 11 and the Data Collectors and Data Manipulation 12 are defined by software engineers interested in using the pattern recognition system 10 for a particular application domain. Data from the Data Collectors and the Data Manipulation 12 work in conjunction with algorithms stored in a Library of Partitioning Algorithms 14, which can also be defined by the software engineers using the system. The system further includes an Operating System 13, a Run Time Library 15, and a Driver 16.

The Application 11, Data Collectors and Data Manipulation 12, Operating System 13, Library of Partitioning Algorithms 14, Run Time Library 15, and Driver 16 can be implemented as programs executed by a conventional digital computer 18. The Operating System 13 is usually supplied by the manufacturer of the digital computer 18. The Application 11 and Data Collectors and Data Manipulation 12 are written in source code which is compiled, linked and loaded by the Operating System 13, and which may incorporate subroutines included in the Run Time Library 15. The Driver 16 is a set of assembly language subroutines which control data transfer between the digital computer 18 and the parallel associative memory 17. The Run Time Library 15 is a set of high-level source code subroutines which call the Driver subroutines. Therefore, the Application 11 calls the subroutines in the Run Time Library in order to operate the parallel associative memory 17.

It can be seen that the parallel associative memory 17 can serve as the foundation for an application-specific recognition system. The system as illustrated in FIG. 1 represents a multi-tiered system wherein the parallel associative memory 17 forms a base or lower tier which carries out the actual pattern recognition process using parameters and patterns defined by upper tiers composed of the Application 11, Data Collectors and Data Manipulation 12 and Library of Partitioning Algorithms 14 together with the Driver 16.

Typically the Application 11 for the pattern recognition system would have some templates or patterns stored in the parallel associative memory 17 which look similar to a recall pattern (recall key). If the recall pattern looks similar enough to one of the templates or stored patterns then the recall pattern can be identified. The ability to adjust the "similar enough" aspect of the problem (i.e. inexact matching) provides the system with the capability to learn. The actual modification methods for adapting the pattern classes are in the Library of Partitioning Algorithms 14.

When the parallel associative memory of the present invention is combined with an adaptive partitioning algorithm then a rule generating system instead of a rule following system is created. Rule following expert systems require that all rules be written by a human and as such are subject to error and are difficult to update. In contrast, rule generating systems create rules directly from the available data and are easily updated. The parallel associative memory of the present invention, because of its speed and storage capacity, makes rule generating systems feasible from a computational standpoint.

Figure 2:
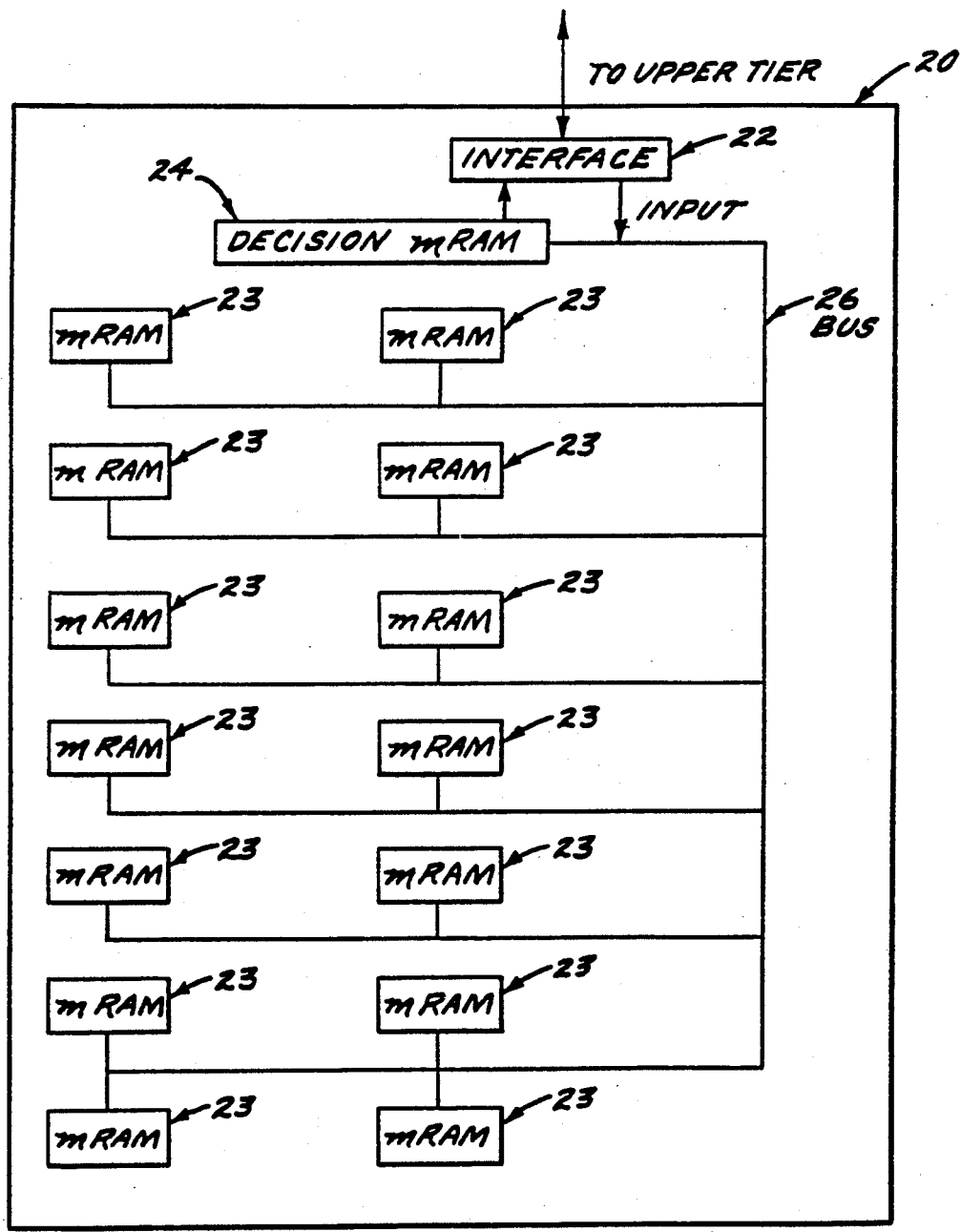
FIG. 2 is a block diagram of a proposed first embodiment of a parallel associative memory of the present invention.

FIG. 2 illustrates a first proposed embodiment of a parallel associative memory of the present invention. The parallel associative memory 20 of FIG. 2 could comprise a plurality of modified memories 23, designated "mRAMs", an interface element 22 and a decision modified memory 24.

A plurality of data or recognition patterns would be stored in each of the mRAMs 23 in accordance with the particular application and the partitioning algorithm associated with the application as defined by the Library of Partitioning Algorithms 14 of FIG. 1.

Interface element 22 would input a recall pattern representative of an observed pattern which is to be identified. The interface element 22 would transmit the recall pattern over a bus 26 into each of the plurality of mRAMs 23 nearly simultaneously. When a recall pattern is presented by the interface element 22, the interface element 22 would activate selected lines of the bus 26 to indicate that there is a recall pattern on the bus. This would assure that each mRAM 23 receives the recall pattern nearly simultaneously.

Each mRAM 23 would carry out a searching process. The searching processes carried out by the mRAMs 23 would be carried out in a parallel so that each individual mRAM 23 conducts its searching process nearly contemporaneously with the other mRAMs 23. Each mRAM 23 would select at least one close recognition pattern from the plurality of recognition patterns stored in that particular mRAM 23 which most closely matches the recall pattern. Each mRAM 23 would output the close recognition pattern which most closely matches the recall pattern to bus 26 which carries the recognition patterns from all of the mRAMs 23 to a decision modified memory 24. The decision modified memory 24 would carry out a searching process using the close recognition patterns from each of the plurality of modified memories 23. The parallel associative memory 20 would output recognition patterns which most closely match the recall pattern. In accordance with the specific application, the upper tier including the Application 11, Data Collectors and Data Manipulation 12 and Driver 16 (all of FIG. 1) would make use of these recognition patterns which most closely match the recall pattern.

Figure 3:
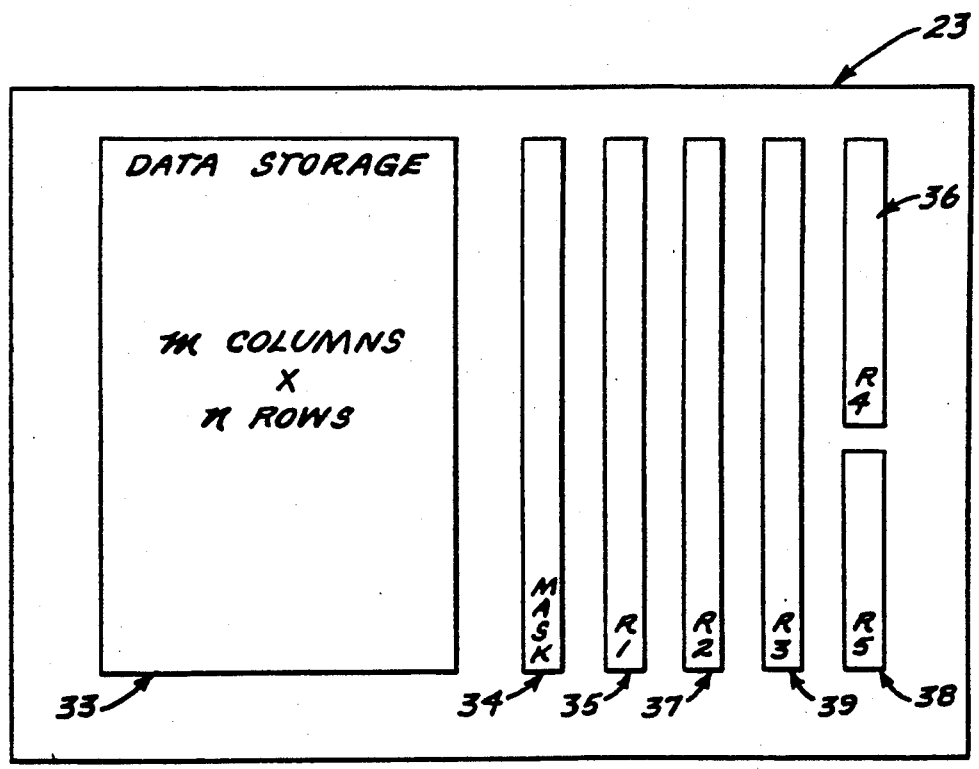
FIG. 3 is a block diagram of a proposed first embodiment of a modified memory that is used as a component of the parallel associative memory of FIG. 2.

The mRAMs may comprise modified random access memory chips. One embodiment for such a mRAM is illustrated in FIG. 3 where mRAM 23 would include a storage area 33 consisting of m columns by n rows. The recall pattern may be entered into an internal register R1, 35 of the mRAM 23. The plurality of recognition patterns would be stored in the data storage area 33.

During each submemory cycle, a row of the data storage area 33, defining a recognition pattern, would be read into a second internal register R2, 37. A bit-wise comparison would be done between the contents of internal registers R1, 35, and R2, 37. The number of mismatches would be noted. If the pattern in the second internal register R2, 37, has the smallest number of mismatches through this point of examination then this pattern would be shifted from internal register R2, 37, to internal register R3, 39, and the number of mismatches associated with this pattern would then be stored in internal register R4, 36. If the number of mismatches in the comparison of the pattern in internal register R2, 37, to the recall pattern of register R1, 35 exceeds the number of mismatches in R4, 36 then the pattern in internal register R2, 37 cannot be a closer recognition pattern than the pattern already stored in internal register R3, 39. Therefore, this pattern would be disregarded and a new pattern from another row of the mRAM 23 would be input into the internal register R2 in its place.

This row by row comparison would be carried out until the recognition pattern having the minimum Hamming distance, i.e., the minimum number of mismatches or differences, would be identified from all of the recognition patterns stored in the storage area 33. When this occurs, the pattern stored in register R3, 39 would be outputted from the mRAM 23 to the bus 26 of FIG. 2.

It is also possible for the mRAM to select a plurality of recognition patterns which are determined to closely match the recall pattern. This plurality of close patterns could be stored in a separate location in the mRAM. When the searching process is completed all of the plurality of close matches would be outputted from the mRAM 23 to bus 26.

When the mRAMs 23 have found their respective nearest neighbor recognition patterns, the mRAM bus control logic would activate an output line on bus 26 of FIG. 2 and the decision modified memory 24 of FIG. 2 would pick up the bit stream which represents the recognition patterns identified by each of the mRAMs 23 as being the recognition pattern in that respective mRAM 23 which most closely matches the recall pattern.

The outputs from the individual mRAMs 23 would be stored in the decision modified memory 24 which would essentially perform the same operation as the individual mRAMs 23. That is, the outputs of each of the individual mRAMs 23 would be stored in a data storage area in the decision modified memory 24. The searching process of comparing the recall pattern to the recognition patterns outputted from the individual mRAMs 23 would be carried out and the decision modified memory 24 would select that recognition pattern or patterns which most closely match the recall pattern from the recognition patterns selected by each of the individual mRAMs. The decision memory could have the capability of ordering the most closely matching patterns.

The recognition process could be speeded up in a number of ways. If it is decided that the only recognition patterns of interest are those patterns that are within some predetermined error distance of the recall pattern that would be stored in internal register R1, 35 then an additional internal register R5, 38 could be added to the mRAM 23. The additional register R5, 38 of FIG. 3 would store a cutoff level corresponding to a number of mismatches which are allowable. During a compare cycle, if the number of mismatches which arise from the bit-wise comparison of the recall pattern in register R1, 35 to the pattern in internal register R2, 37 would exceed the cutoff level of register R5, 38 then further comparisons would be halted and the pattern stored in internal register R2, 37 would be skipped.

There is a second possible use of register R5, 38 and a threshold or cutoff level that it would contain. It would be possible to select the first pattern having fewer mismatches than the threshold as the pattern that closely matches the recall pattern and halting further comparisons. This would be considered a close-enough search.

Another method for reducing search time is to reduce the search space. This can be accomplished by partitioning the stored patterns into subpatterns or subspaces. For example, a MASK register 34 could be added to the mRAM 23. The MASK register 34 would be used so that only recognition patterns that match specific parts of the recall pattern would be candidates for the full comparison process. For example, it is possible to select from the patterns stored in data storage 33 of the particular mRAM 23 only those patterns which have a specific bit pattern in designated bit areas and these patterns constitute a subset of the entire bit pattern. This creates a subspace, a subset of the stored recognition patterns, which would then be compared to the recall pattern. In this case the MASK register 34 would be used as a Subspace Mask.

The patterns in the subset which are closest to the recall pattern would then be transmitted by the mRAM 23. This creates a hierarchically structured data base for recognition patterns which can further speed up the process of pattern recognition and matching.

It is also possible to add additional information to the pattern which is not to be used for the process of recognition or matching. For example, identification or tag bits may be associated with specific bit positions of either a recognition pattern or a recall pattern. But the identification or tag bits should not affect the matching or recognition process. The MASK register 34 could be used as an Ignore Mask so that the tag or identification bits will not be considered in the comparison operation. These bits could then be used by the Application 11 of FIG. 1 to carry out some activity once the recall pattern is recognized. This enables the mRAMs 23 to behave together like hetero-associative memory. Without the tag bits, the mRAMs act like an auto-associative memory in that they correct the recall pattern by mapping it to a stored recognition pattern that most closely matches the recall pattern.

A preprocessing operation could be carried out to reduce the number of stored patterns to be compared to the recall pattern. It is possible that if several patterns, which are close together in Hamming sense, represent the same thing then only one pattern needs to be stored. This ultimately reduces the number of comparison operations which must be carried out for the purposes of recognizing a pattern.

The part of this recognition process that incurs the expense of the most effort is in the counting of mismatches. A plurality of parallel associative memories of the present invention could be working in parallel, after the mRAMs 23 are loaded from a secondary storage system during system start-up. Pre- and post-processing of the stored patterns could be done off line.

A number of video RAMs might be able to act as the mRAMs 23 discussed above. Unfortunately, they are presently limited in storage space and functionality. Conventional dynamic random access memories, however, have relatively large storage densities. Therefore in order to provide a parallel associative memory with a large memory capacity one may add the additional functions carried out by the modified memories to conventional dynamic random access memories.

Figure 4:
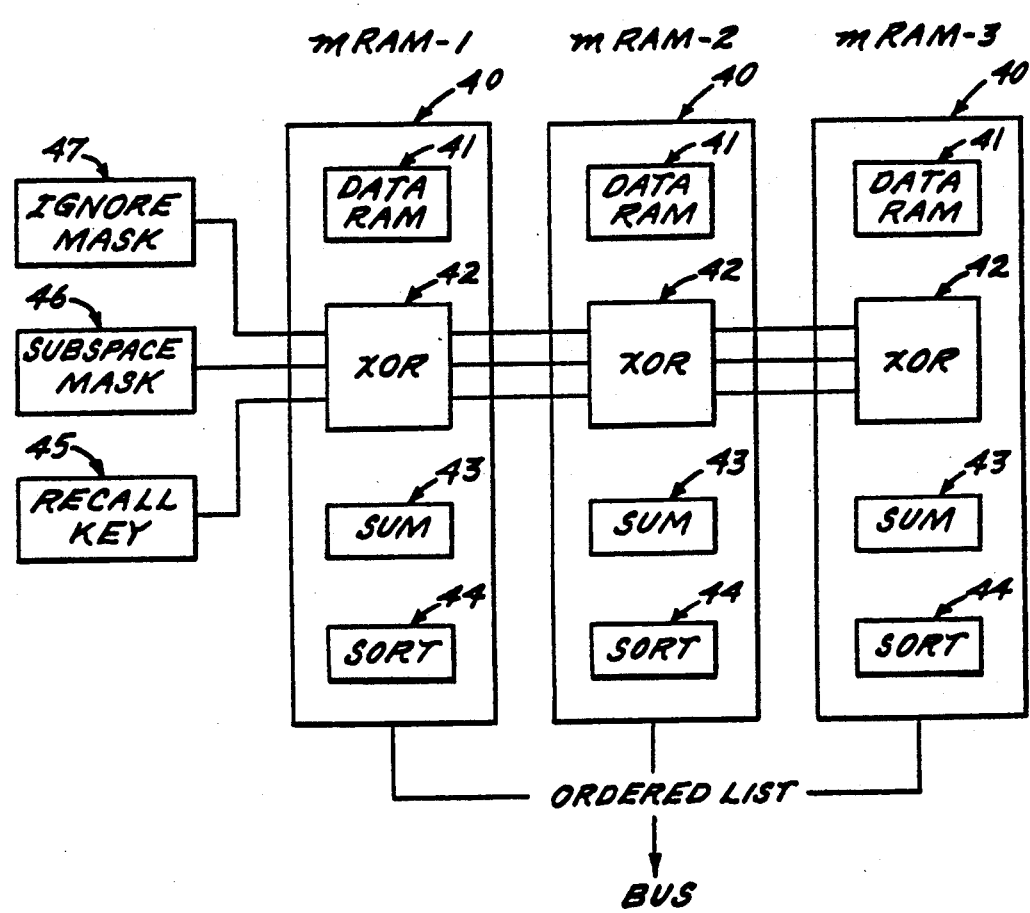
FIG. 4 is a block diagram of a proposed second embodiment of a parallel associative memory of the present invention including a second embodiment of a modified memory.

FIG. 4 illustrates a second embodiment of the present invention using a second embodiment of the modified memories. The modified memories have sorting capabilities removing the necessity for a separate decision RAM.

The modified memories of FIG. 4 are designated as blocks 40. The modified memories 40 could include data RAM 41, Exclusive-OR element 42, Sum element 43 and Sort element 44. The recall pattern would be entered into a recall key register 45. A Subspace Mask 46 and an Ignore Mask 47 operate as described above in relation to the first embodiment of the modified memory. The recall key register 45 would enter the recall pattern into the Exclusive-OR element 42 of each of the modified memories nearly simultaneously. The data RAMs 41 of each modified memory 40 would store the recognition patterns for the respective modified memories. The Exclusive-OR element would act as a bit-wise comparator and would carry out the bit-wise comparison of the recall pattern and the recognition patterns stored in the data RAM. The summing logic of Sum element 43 and the ordering processes of the Sort element 44 would monitor the number of mismatches which occur when the recall pattern is Exclusive-ORed with each of the recognition patterns so as to order the patterns in such a manner that the recognition pattern or patterns of the modified memory 40 most closely matching the recall pattern (the nearest neighbor recognition pattern) would be selected as the output of the modified memory.

Figure 5:
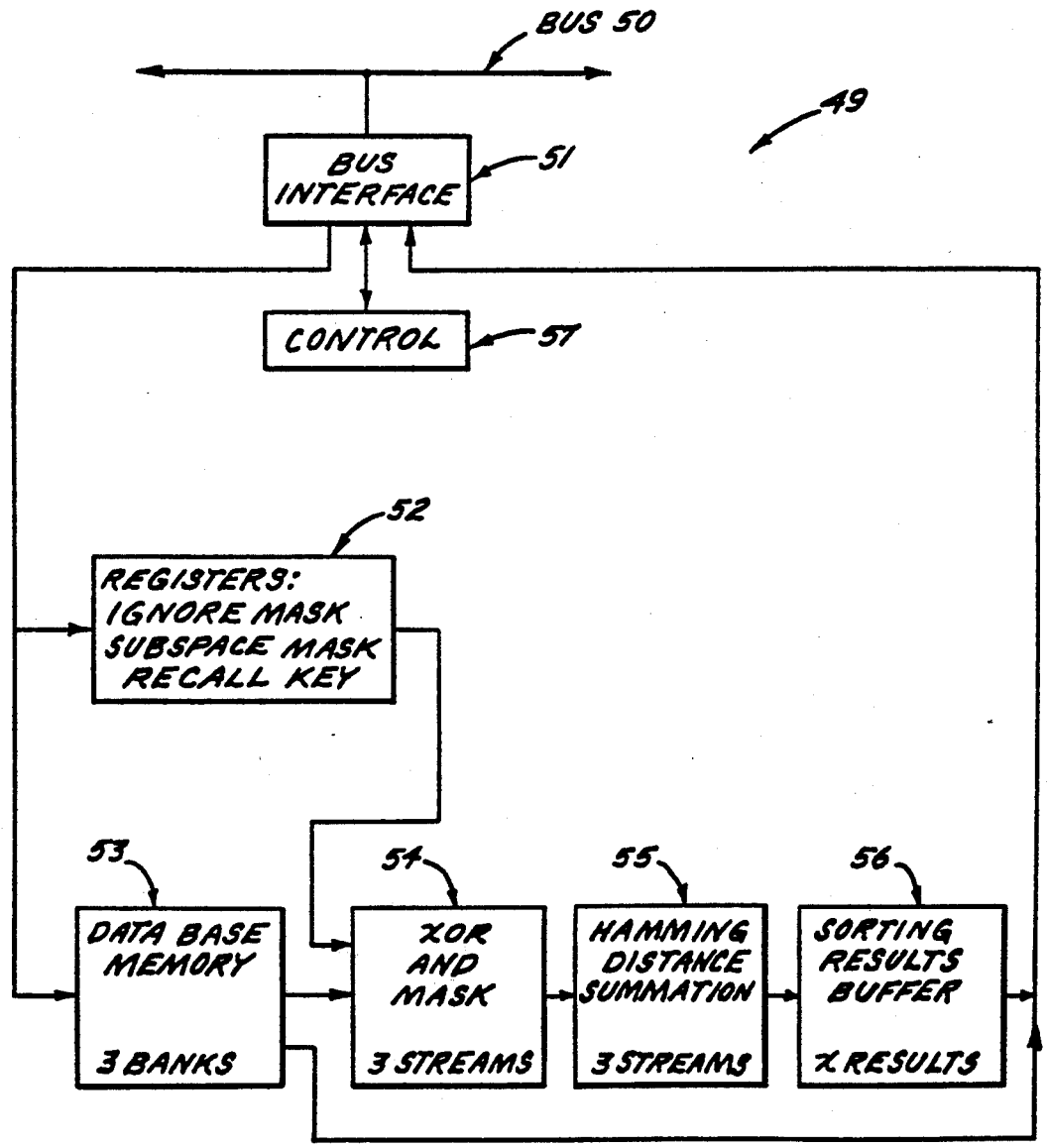
FIG. 5 is a block diagram of a third embodiment of a parallel associative memory of the present invention.

FIG. 5 illustrates a third embodiment generally designated 49 of a parallel associative memory of the present invention. An interface device 51 interfaces the parallel associative memory 49 with a subsystem bus 50. Control 57 controls the operation of the interface device 51. The interface receives the recall key (recall pattern) from the bus 50 as well as the Masks (Ignore and Subspace) and stores them in the appropriate registers in register area 52 of the parallel associative memory. The interface also receives the recognition patterns which are to be stored in the data base memory 53. The data base memory may comprise three banks of data. The number of possible banks of data is limited only by the number of banks that can be placed on a board that implements this device. Each bank is a distinct storage area containing a different set of recognition patterns. Exclusive OR area 54 receives the recall pattern and the MASKS from register area 52 and separately Exclusive ORs the recall pattern with three different parallel streams of recognition patterns which simultaneously are input to the Exclusive OR area from the data base memory 53. The Hamming area 55 keeps track of the number of differences arising from the comparisons with each pattern stream. It then transmits distance results to the sorting area 56 which selects a predetermined number of recognition patterns from all three streams of recognition patterns on the basis of their similarity to the recall pattern.

Each of the three registers in register area 52 may contain multiple entries which may be selected by the value of the mask start address. Note that the masks and recall pattern that are used for a particular search must start at the same address, and that address is unrelated to the data base start address. Once a mask or the recall pattern has been written, it remains valid until any portion of the mask or recall pattern has been written over. So that recognition pattern bits, mask bits and recall pattern bits are in the same position, storage of the masks and recall key is identical to that of the recognition patterns except that the header fields are usually unused. The length of the recall pattern is specified by using the Ignore mask to ignore extra bits. Both masks and the recall patterns should have lengths as long as the longest pattern slot.

The bus interface 51 at least includes parameter registers, a status register, a write data register and a read data register.

The parameter registers are written from the bus 50 while the parallel associative memory is idle. Once a parameter register has been written, its contents are used until a new value is written. This write operation has no immediate effect. The parameter registers may contain the following fields:

1. Header mask—A 16 bit mask, in which each logical 1 indicates the presence of a header bit within the first word of a pattern. The header bits included a "used flag" and any "radius of attraction." By default, the used flag is masked, so the mask only specifies which bits contain the radius. Mask bit M0 corresponds to radius bit r0.
2. Data base start address—Absolute address within the data base memory, in the range at which the search is started.
3. Mask start address—Absolute address within the mask register memory of the start of the recall key and masks.

The status register may be read at any time by the bus 50. The read operation has no affect on the board. The status register contains at least the following field:

1. Number of matches found—A number between 0 and X. More than X matches is indicated by the completion status.

The write data register may be written to by the bus 50 during a command which writes data into the data base memory or the mask registers or the recall pattern register.

The read data register may be read by the bus 50 during a command which reads data from the data base memory.

PIDNs of matching patterns and their respective distance results are stored, in order by distance result, in a results buffer during the search. The closest X results are saved and any additional results are lost. When the result port is read the order is: PIDN of closest result first, distance of closest result; next, PIDN of second closest result, distance of second closest result; etc.

FIG. 6 illustrates the storage configuration in the data base memory 53 of FIG. 5. There are three data banks, including bank 0, bank 1, and bank 2. Each data pattern, with a corresponding header, is contained entirely in one bank and occupies a pattern slot within the bank. The pattern slot consists of one or more words of a prescribed number of bits. Parallel pattern slots, that is corresponding pattern slots in each of the three banks, must start at the same address, must be of the same length and must contain patterns of the same length.

The data base memory may contain any number of different length pattern slots in order to store patterns of different lengths. The various lengths of the patterns are specified by length identifier words (LIW). Each LIW spans all three banks at the same address and consists of one word from each bank. Each LIW specifies the length of all following pattern slots up to the next LIW. Each pattern slot is uniquely identified by a PIDN, a pattern identification number, which is a bank, slot number pair-PAT(b,n). Each LIW is identified by the slot number of the pattern slot which follows it. Thus LIW numbers are not consecutive.

FIG. 7 illustrates formats for data words in the data base. The lowest order bit in the first word for a pattern and the first word in bank 0 for a LIW is used to store a use flag (UF). The use flag (UF) is a logical 1 to indicate a valid data pattern. If the use flag is a logical 0, then the second lowest order bit in bank 0 is used to store a LIW flag (LF) which is a logical 0 to indicate a LIW word. In a LIW word, the third lowest order bit in bank 0 is used as an end of data base flag (EF) which is a logical 0 to indicate the end of a data base of patterns in the data base memory 53. In other words, a search through the data base memory is terminated when a LIW word is reached having an end of data base flag (EF) which is a logical 0.

In the format of FIG. 7, the slot of a LIW word in bank 0 includes a number specifying the number of words per pattern which follow the LIW word. If this number is zero, the end of a data base is signalled. The remainder MASK field in the LIW identifies the bits which must be ignored in the last word of the following pattern slots in order to specify the exact length in bits of the patterns in the pattern slots. The first word in each pattern slot contains the header. The header includes a radius of attraction that is used to control the search and a flag to indicate whether that pattern slot is currently being used to contain a pattern. A header MASK from a parameter register identifies which bits of the first word of the pattern slot are to be the header bits. Therefore, all patterns within the data base memory must have headers of the same size.

In operation the third embodiment 49 of the invention permits three banks of data to be simultaneously compared to a recall pattern. Upon completion of comparison a plurality of recognition patterns are selected and sorted so as to provide the nearest neighbor recognition patterns from the recognition patterns stored in the data base memory. The Ignore and Subspace masks of the third embodiment are used in the same manner as the masks used in the first embodiment of the invention. They are used to reduce the searching time by reducing the amount of searching necessary.

Figures 8, 9:
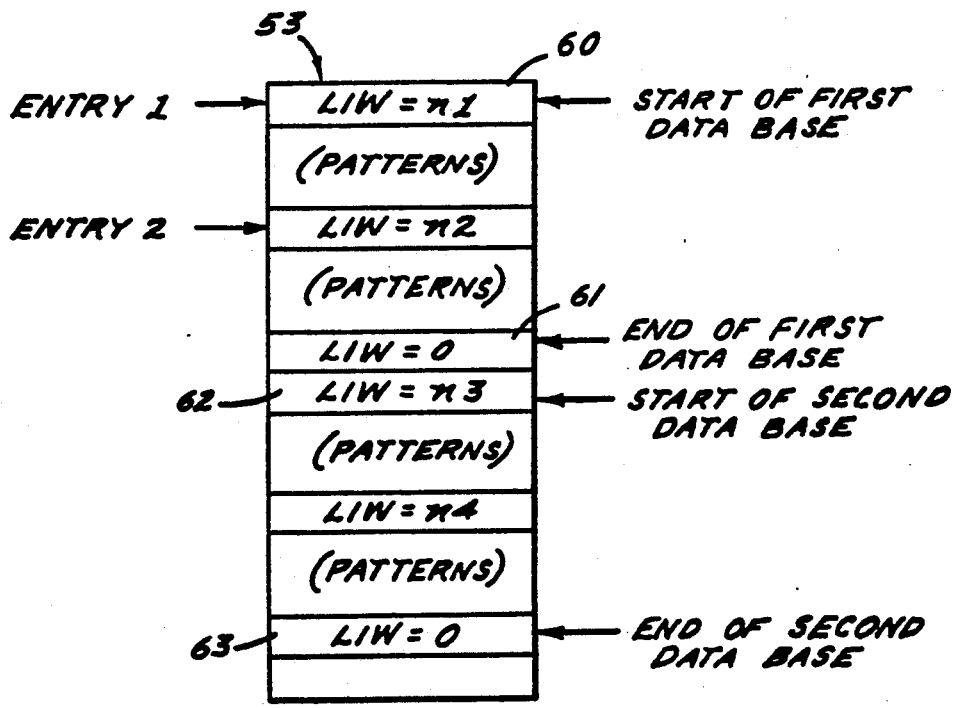
FIG. 8 is a diagram illustrating a pattern storage format for the data base configuration of FIG. 6.
FIG. 9 is diagram illustrating multiple data bases of recognition patterns being stored in the data base memory of the parallel associative memory of FIG. 5.

Turning now to FIG. 9, there is shown one method of defining multiple data bases of recognition patterns in the data base memory. A first data base starts with a LIW word 60 and ends with a LIW word 61. A second data base starts with a LIW word 62 and ends with a LIW word 63. In order to terminate the search process at the end of each data base, the terminal LIW words 61, 63 have an end of data base flag (EF) which is a logical zero, or which specifies a length of zero.

The data bases start with LIW words to permit searching to start at the beginning of each data base. Additional entry points can be provided by placing additional LIW words in each data base. Such an organization is especially useful if the initial patterns in each data base are more likely to match a typical recall pattern. In the event that a sufficient number of matches are found in the initial portion of the data base so that searching will be terminated before the end of the data base is reach, a new search may be started at an intermediate entry point in order to search the rest of the data base.

In addition to placing LIW words in the data base memory and setting or resetting the end of data base flags (EF), the portions of the data base memory 53 to be searched can be defined by using the subspace mask to set conditions for effectively including a pattern, and setting and resetting the used flags (UF) to temporarily remove selected patterns from the data base memory. Alternatively, the addressing of the data base memory 53 could be further controlled by parameters such as a "terminal address" or a "number of patterns to search" from the initial address.

In view of the above, the parallel associative memory according to the present invention is applicable to a wide range of potential applications. One application domain of considerable importance is that of knowledge systems capable of intelligent reasoning. Some researchers, for example, believe that reasoning is dominated by a process of "recognition" in which new objects and events are compared to a set of expected prototypes. See, for example, D. Bobrow & T. Winograd, "An overview of KRL, a Knowledge Representation Language," Xerox Palo Alto Research Center, Palo Alto, Calif. 94304 (July 4, 1986) pp. 18. As described by Bobrow & Winograd, a matcher takes two inputs: a pattern, and a specific object to be tested. In its simplest form, the matcher compares the exact forms of the two given representative structures; at the other extreme it guides the overall processing of the system. The matcher may use the semantics of descriptors as well as their syntactic form to decide whether two descriptions match. The matcher may search for a referent of a description (in order to use its properties), invoke special match procedures associated with a descriptor type or a specific pattern, and invoke a general reasoning process to search for chains of implication.

Figure 10:
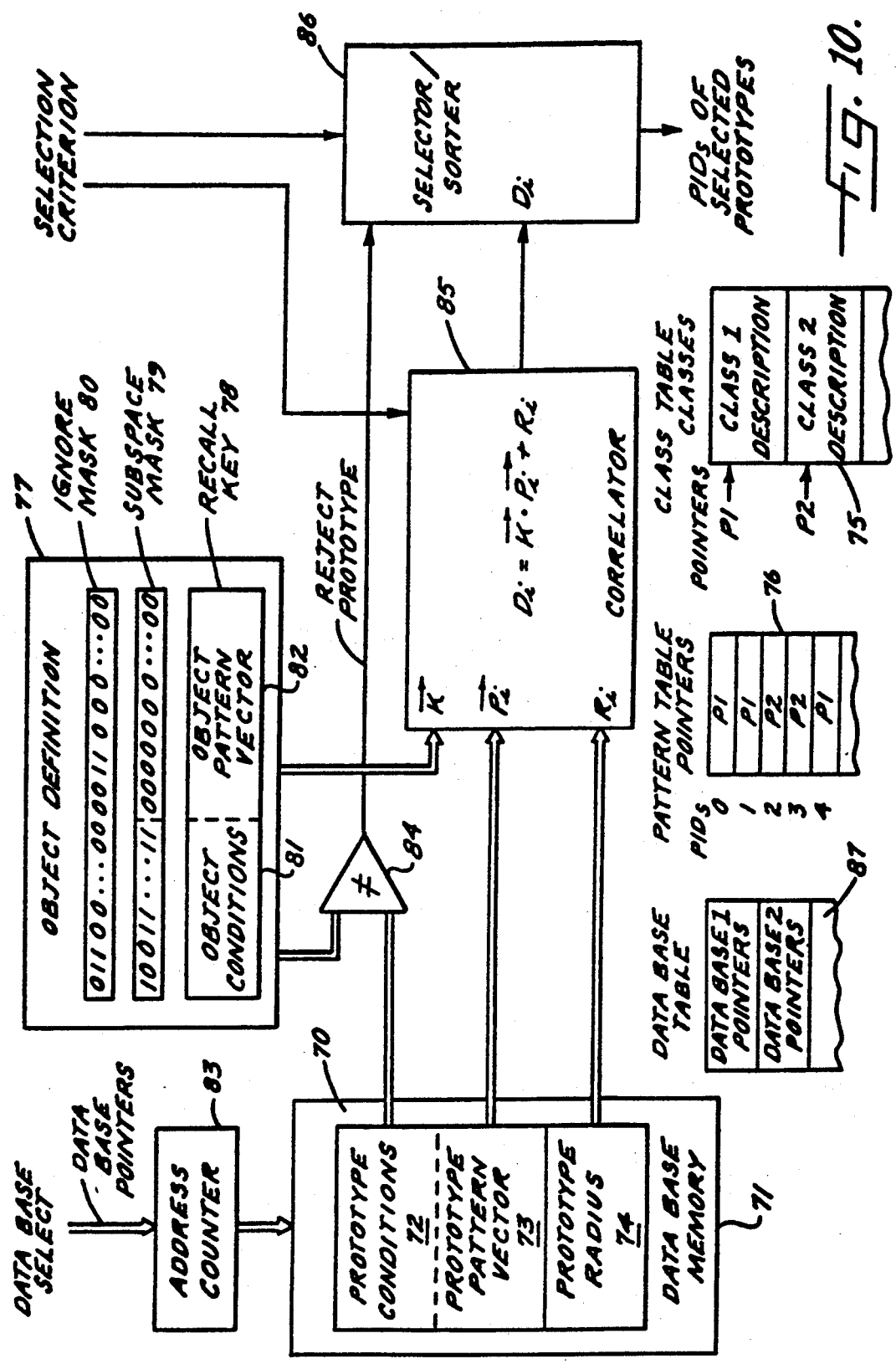
FIG. 10 is a diagram illustrating the use of the present invention for encoding knowledge prototypes for use in an artificial intelligence application.

Turning now to FIG. 10, there is shown a schematic diagram which illustrates the use of a parallel associative memory to execute a "recognition" step in a reasoning process. Knowledge about a subject domain is represented at the most elementary level as a set of prototypes 70 which are stored in a data base memory 71. A prototype represents each possible decision in the reasoning process, and therefore prototypes are analogous to rules in a rule-based knowledge system.

Associated with each prototype is a set of Boolean prototype conditions 72, a prototype pattern vector 73, a prototype radius 74, and a class description or conclusion to be inferred when a match occurs. Since the class descriptions need only be used by the host computer (18 in FIG. 1), they can be efficiently stored in a conventional memory 75 and referenced by a pattern table 76 of pointers which is indexed by the pattern identification numbers (PIDs). Therefore, once the host computer obtains the PID of a matching prototype selected by the parallel associative memory, the host computer can use the PID as an indirect address to obtain the respective class description. This method of storing the class descriptions also readily permits a number of different prototypes to be associated with each class description; the association is governed by the pointers which are stored in the pattern table 76. Alternatively, the pointer for each prototype could be stored in the data base memory 71 as a prototype tag which is masked by the Ignore Mask during the recognition process. The pattern table 76 could also store, for ease of access, the bit length of each pattern and a copy of the radius.

During the recognition process, the parallel associative memory attempts to match a given object 77 with one or more of the prototypes 70 stored in the data base memory. The object is defined by a recall key 78, a Subspace mask 79, and an Ignore mask 80. The Subspace mask 79 and the Ignore mask 80 specify respective portions of the recall key as object conditions 81 and an object pattern vector 82 corresponding to the prototype conditions 72 and the prototype pattern vectors 73 stored in the data base memory 71.

During the recognition process, data base select signals are sent to an address counter 83 which sequentially addresses a selected portion of the data base memory. A comparator 84 compares the object conditions 81 to the conditions 70 of each addressed prototype and generates a signal for rejecting the prototype when the object conditions fail to match the prototype conditions. A correlator 85 compares the object pattern vector 82 to the prototype pattern vector 73 by computing the correlation or scalar product the vectors. In response to a selection criterion signal, the correlation is selectively adjusted by the radius of attraction for the prototype. For pattern recognition, the correlation is usually adjusted by the radius of attraction, but for pattern classification or learning, it is sometimes desirable to ignore the prototype radius in order the determine the distance of a new object from the centers of the nearest prototypes. This will be explained further below in connection with FIGS. 11 to 13.

The "reject prototype signal" from the comparator 84 and the value computed by the correlator 85 are fed to a selector/sorter 86 which selects and sorts a specified number of the prototypes which are not rejected and which closely match the object definition as indicated by the value computed by the correlator 85. The selector/sorter 86 receives selection criteria signals which indicate, for example, the maximum number of prototypes to be selected and sorted, and whether a threshold should be used for the selection process. Typically a predetermined threshold of zero should be used to select the prototypes which are to be sorted. For pattern recognition, the selection criterion typically specify that the selector and sorter 56 should select for sorting only those prototypes for which the value computed by the correlator 85 is at least zero. In other words, a prototype is rejected if it falls outside of the prototype radius of attraction. However, for pattern classification or learning, it is sometimes desirable to find the "nearest neighbor" prototypes, in which case a prototype should be rejected if the computation from the correlator 85 is less than zero.

The system of FIG. 10 offers a number of important advantages for a rule-based artificial intelligence application. The "rules", represented by the prototype pattern vector, are in effect content addressable via their prototype conditions. Therefore, the "domain knowledge base" is readily modified by adding or deleting the rules. The Application (11 in FIG. 1) defines the control information about when to invoke the rules for a selected context by issuing a "search" command to the parallel associative memory. Therefore, the "control knowledge" is separate from the "domain knowledge" for the particular application.

The selector/sorter determines which of the pertinent rules are to be applied. The Application may adjust the maximum number of rules to be applied to control the depth of the reasoning process. The rules to be applied are sorted so that the Application may first examine, and assert or propagate, the conclusions of the most pertinent rules. The strength of a conclusion is quantified by the distance measurement, which provides a "certainty factor" for the conclusion.

Each rule to be applied is classified with the other rules to be applied which may confirm or call into question a common conclusion. The Application is free to define the method of resolving conflicting rules, resolving conflicting conclusions, and asserting the conclusions. The classification knowledge is independently stored in the pattern table 76, and the knowledge of how to resolve conflicts and assert respective conclusions is independently stored in the list of class descriptions 75.

The Application may resolve conflicts, for example, by combining and propagating certainty factors if the degree of conflict is relatively low, requesting the input of additional information if additional information will resolve the conflict, or invoking rules for conflict resolution. The rules for conflict resolution may decide that the originally-applied rules were inconsistent or insufficient. In this case the rules for conflict resolution may invoke learning rules which modify the originally-applied rules or add additional rules so as to minimize the likelihood of future conflicts.

To carry out a complex reasoning process, a number of reasoning steps as described above would be required to establish a "chain of inference." Each reasoning step searches for applicable prototypes or rules in a respective data base in the data base memory 71. In other words, a respective data base is provided for each context or issue that may arise during the reasoning process. The assertion of a particular conclusion may cause the current issue to be resolved and searching to being for the next issue in the chain of inference. Alternatively, the assertion of a particular conclusion, or the failure to find any applicable rules, may cause searching to begin for a previous issue in the chain of inference. The choice of a forward chaining or a backward chaining reasoning process is preferably defined by the Application (11 in FIG. 1).

In general, it is desirable to provide a data base table 87 for storing certain information about each data base. This information includes, for example, the starting address of the data base in the data base memory, the ending address of the data base in the data base memory, the number of patterns or prototypes in the data base, a pointer to the pattern table 76 for the data base, and a pointer to the class table 75 for the data base.

The Run Time Library (15 in FIG. 1) may provide subrountines for reading and writing to the data base table 87, the pattern table 76, and the class table 75. In addition to storing information used during searching of the data base memory 71, the tables may store pointers to natural language textual information such as data base, class and pattern names which could be useful for documenting the content and organization of the knowledge in the data base memory and explaining or tracing a chain of reasoning.

Figure 11:
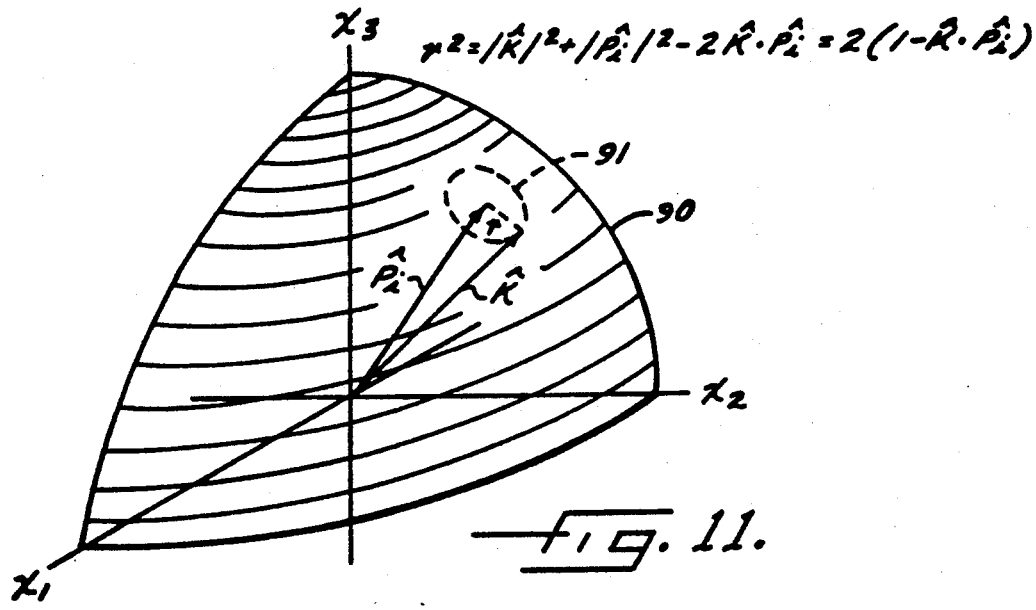
FIG. 11 is a diagram illustrating pattern space for patterns which are three dimensional vectors.
Figure 12:
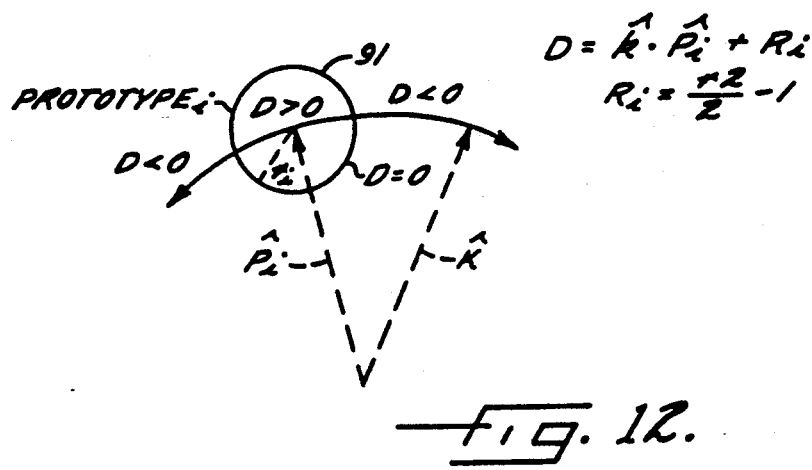
FIG. 12 a is a diagram illustrating the use of a radius of attraction associated with a recognition pattern.
Figure 13:
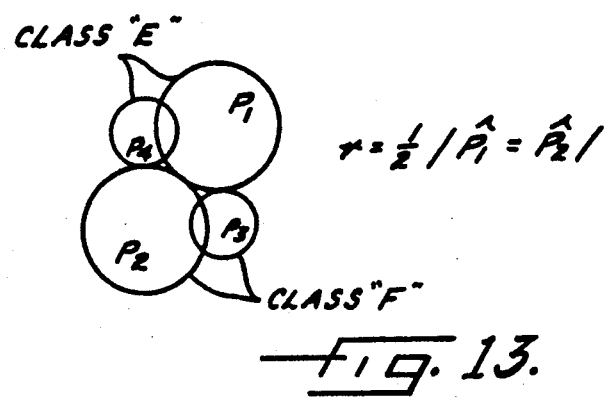
FIG. 13 is a diagram illustrating a method of automatic learning wherein new recognition patterns and radii of attraction are determined by finding the "nearest neighbors" to newly defined recall patterns.

The concept of the prototype radius and nearest neighbors is illustrated in FIGS. 11–13. In FIG. 11 it is assumed that the pattern vectors each have three elements, and each element is specified by a multiplicity of bits. In other words, in contrast to the bit string patterns which are compared on a bit-wise basis, the patterns shown in FIG. 11 are compared by a multi-bit multiplication of the elements. In practice, it is desirable to provide a correlator which can selectively perform a bit-wise comparison or a multi-bit or byte-wise comparison by multiplication. As further described below in connection with FIG. 17, the masks can be used to specify which portions of the pattern vectors are to be compared in a bit-wise fashion or in a byte-wise fashion.

In general, the selection between a bit-wise comparison or a byte-wise comparison should be performed based upon the attributes of the data. For binary data, a bit-wise comparison may suffice, while for analog data it is preferable to perform a comparison in a multi-bit or byte fashion. However, for binary data in which certain bits in the patterns represent features which are more important than others in distinguishing one pattern from another, it may be preferable to perform a multi-bit or byte-wise comparison in order to give the more important bits larger numerical weights than the less important bits. Alternatively, a bit-wise comparison could be performed but a multiplicity of bits associated with an important feature could be all set or all clear to represent whether the important feature is present in the object. In each prototype in this case, a respective number of the multiplicity of bits could be set to indicate the relative importance or weight of the feature in distinguishing the prototype from the other prototypes.

Since the correlator computes a sum of products plus a constant, it can also perform a linear discriminate function that is useful for propagating "certainty factors" associated with the selected prototypes. In the case where the prototype represents a "rule", each element of the pattern vector represents a piece of evidence that tends to prove or disprove the conclusion associated with the rule. Therefore, each element of the object pattern vector indicates the "certainty factor" associated with the observed piece of evidence, and the corresponding element of the prototype pattern vector gives a numerical weight which indicates whether the piece of evidence would tend to prove or disprove the conclusion. The correlation is a numerical value tending to indicate the strength of the conclusion associated with the particular rule. The radius of attraction establishes a threshold for deciding whether to assert the conclusion.

Although the computation performed by the correlator is linear, it can also be used to perform nonlinear functions. In this case, the object pattern vector 82 would represent a number of independent variables and their powers and cross-products, and the prototype pattern vector 73 would represent the Taylor's series approximation of the nonlinear function, with the prototype radius parameter providing the zero-order coefficient.

The correlator 85 could also perform traditional correlation functions such as Fourier analysis and signal detection or filtering. In this case each prototype would represent a particular sine or cosine signal at a given frequency, or a particular phase of the signal to be detected. For speech recognition, for example, the pattern vector could represent a particular phonem at a particular pitch and for a particular context. The pitch and context could be specified by the prototype conditions. The pitch, for example, could be dependent upon the recognition of a particular speaker or on the average pitch of the speech. The context could be dependent on the preceding phonems, words or meaning ascribed to the words.

As shown in FIG. 11 it is assumed that the pattern vectors are normalized so that their terminal points reside on a sphere 90 which defines a "pattern space." For pattern vectors which have single bit elements, the vectors will already be normalized since the magnitude of all of the pattern vectors will be equal to the square root of the number of bits in the vectors.

In many cases the raw data will have substantial amplitude fluctuations. In some of these cases, the amplitude fluctuation over a sampling interval will not include a significant amount of information, and the raw data can therefore be sampled and the vector of samples over the sampling interval can be normalized in the usual fashion. If the amplitude fluctuation over the sampling interval includes a significant amount of information, then the vector of samples over the sampling interval should be transformed to obtain a normalized pattern vector. The optimum transformation will depend upon the particular application. One transformation method is to project the sample vector onto a hypersphere so that the pattern vector has an additional dimension or element responsive to the amplitude of the sample vector. The normalized pattern vector P, for example, can be obtained from the sample vector S, according to:

$$P = (S\sin\theta, \cos\theta) \text{ where } \theta = \tan^{-1}(m|S|)$$

$$P = \frac{(a_1, a_2, \ldots, a_n, m)}{\sqrt{a_1^2 + a_2^2 + \ldots + a_n^2 + m^2}}$$

In these equations, the factor m is a constant for the object pattern vector and the set of prototype vectors. The value of m is selected taking into account the fact that the amplitude of the sample vector is substantially compressed above a level of m. The factor m also weights the importance of the amplitude information relative to the angular information.

One kind of transformation that is sometimes useful for the reduction of analog data is a rotation of the coordinate system. If the coordinate system can be rotated such that a particular element of all the prototype pattern vectors becomes substantially zero, then that element can be eliminated from all of the pattern vectors. The desired rotation can be found by iteratively rotating the coordinate system in the planes of pairs of coordinate axes by an incremental amount, and testing if the values of a particular element in all of the prototype pattern vectors either all increase or all decrease; if so, then an incremental rotation in that plane can reduce that particular element of all of the prototype pattern vectors toward zero. The transformation itself is a linear transformation and the transformed values of each element for each prototype vector can be obtained by correlating the prototype pattern vector with the corresponding column vector of the rotational transformation matrix which includes the sine and cosine of the angle of incremental rotation. The general problem of finding such a rotational transformation to eliminate columns of a matrix is well known in linear algebra. In effect, the transformation identifies those features which distinguish the patterns.

As shown in FIG. 11, the closeness of the object pattern vector K to a prototype pattern vector $P_i$ is proportional to the correlation or scalar product in accordance with the law of cosines. In particular, the correlation or scalar product is a maximum when the distance between the terminal points of the pattern vectors is zero. Since a pattern vector and radius is associated with each prototype stored in the data base memory, the prototype defines a circle 91 on the spherical pattern space 90. In the typical case, the pattern vectors will have a large number of elements, so that the prototypes represent hyperspheres in the pattern space.

As further shown in FIG. 12, it is desirable for the correlator to compute a distance D or measure of closeness which is positive for patterns residing within the prototype 91 and is negative for patterns residing outside of the prototype. Preferably the correlator computes the sum of the scalar product and a parameter R which is related to the square of the actual radius r of the prototype.

FIG. 13 illustrates that a number of patterns are usually defined to represent a particular class of objects. For optical character recognition, for example, each class of objects might represent an alphanumeric character. A simple method of pattern classification would store in the data base memory 71 one prototype pattern vector for each character and each prototype pattern vector would correspond exactly to the most likely representation of the alphanumeric character. A given object could be matched by finding the prototype pattern vector having the maximum correlation. This would have the undesirable effect of recognizing certain objects as alphanumeric characters when in fact they match poorly with all of the prototypes. Therefore, it is desirable to use a threshold to determine whether a given object pattern vector is sufficiently close to a given prototype pattern vector that a match should be indicated. Moreover, it is desirable to associate a radius of attraction with each of the prototype patterns in order to more precisely define irregular boundaries between the regions in the pattern space which are to be associated with the respective pattern classes.

In order to find the radius of attraction that should be associated with each prototype that is most representative of each class, the distance to the nearest neighbor prototype most representative of another class can be found and the radius of attraction can be selected to be half of that distance. As shown in FIG. 13, for example, this would result in a prototype $P_1$ for the class "E", and pattern $P_2$ for the class "F". At this point, however, there would be a good deal of pattern space that is not included in any of the prototypes but which should be recognized as a particular alphanumeric character. More important is the fact that some of the pattern space outside of the prototypes should not necessarily be associated with the prototype having the nearest surface. Therefore, it is necessary to add additional prototypes to the data base memory for each of the alphanumeric characters.

In order to more precisely define the boundaries between the classes of prototypes, the radius of attraction for the new prototypes can be based upon the distance between the new prototype pattern vectors and the surfaces of the nearest neighbors associated with different classes. In order to determine this information, it is desirable to use the new prototype pattern vector as an object pattern vector and to search the data base memory for prototypes for which the distance D is computed to be less than zero. Such a search is referred to as a "search for nearest surfaces."

For many applications, the user has an initial set of data representative of objects to be classified. These data can be used as a "training set". For this purpose, it is assumed that the data are first manipulated or transformed as described above so that the correlator can efficiently distinguish the objects which are members of different classes. In other words, it is desirable to reduce the raw data to a form in which there will be relatively large distances or angles between the vectors of the reduced data representing what the user perceives to be unrelated patterns or patterns of different classes.

A training algorithm is used to generate and store, in the data base memory, a minimal set of prototypes which can be used to correctly classify the objects of the training set. In a typical training algorithm, each vector of reduced data is used as an object pattern vector and the parallel associative memory is commanded to search for a match of the object pattern vector with a previously stored prototype. A match occurs when the object pattern is on or within the hypersphere of the prototype; in other words, the distance D computed from the prototype and the object pattern is positive.

For many applications, it is desirable to associate each object with more than one class. However, for the sake of illustration, it will be assumed that each object or prototype is to be associated with at most a single class. In other words, the classes are disjoint. If a matching prototype associated with the desired class for an object pattern is not found in the data base, then either a new prototype associated with the desired class is stored in the data base to include the object pattern, or the radius of an existing prototype associated with the desired class is increased to include the object pattern. If a matching prototype not associated with the desired class for an object pattern is found in the data base, then the radius of the matching prototype is reduced to exclude the object pattern.

After all of the vectors of reduced data in the training set are iteratively compared to the stored prototypes, the stored prototypes still might not properly partition the pattern space so that each object pattern is included in only prototypes of the desired class. This is a consequence of the fact that a change in existing prototypes having been performed for a given object might cause a previously included object to become excluded from a desired class, or might cause a previously excluded object to become included in an undesired class. This problem can be solved in a number of ways. At one extreme, the comparing steps are repeated for the entire training set until only correct matches occur. At another extreme, modification of the prototypes at the step for a given object takes into consideration all of the previously matched objects so that they will still be properly included or excluded from the prototypes. Another solution is to add additional features that serve to further distinguish the objects that are to be classified in different classes.

For many applications, the typical training algorithm repeats the comparing steps for the entire training set until only correct matches occur, but convergence is accelerated by modifying the prototypes at the step for a given object by taking into consideration a certain number of nearest neighbor prototypes to the given object; for example, the radius of the nearest neighbor prototype associated with the desired class is increased to include the given object so long as the distance from the given object pattern to the prototype pattern of the nearest neighbor of the desired class is less than the distance from the prototype pattern of this nearest neighbor to the surface of its nearest neighbor of a different class; otherwise, a new prototype is added having a prototype pattern vector equal to the object pattern vector and having a prototype radius equal to the distance to the nearest surface of the nearest neighbor associated with a class different from the desired class.

For partitioning, therefore, it is desirable to search for nearest neighbors and to include only a desired class or exclude the desired class. This can be done by finding the prototypes having the nearest N surfaces and then inspecting their classes. Alternatively, to each prototype a tag can be appended which identifies the class associated with the prototype. The nearest neighbor of a specific class can be found by using the subspace mask specifying the class to include. The same kind of search could find the nearest neighbor except those of the specified class by operating the selector/sorter (86 in FIG. 10) to exclude those patterns for which the tag matches the subspace mask; in other words, a selection criterion signal could be used to selectively complement the "REJECT PROTOTYPE" signal in FIG. 10.

A specific embodiment of the present invention preferably incorporates dynamic random access memories since such memories presently offer the best combination of storage density and access speed at the lowest cost. A specific embodiment can be built by using conventional memory chips in conjunction with logic circuit or the logic circuits could be integrated with the dynamic memory on individual chips. The first case is preferred for development and initial production, while the second case is preferred for mass production. A specific embodiment using conventional dynamic random access memory chips and logic circuits is shown collectively in FIGS. 14, 15, 18 and 19. This specific embodiment is similar to the third embodiment of the invention shown in FIG. 5. The specific embodiment, however, uses four banks of pattern memory wherein each bank outputs eight bits of data at a time, in contrast to the third embodiment of FIG. 5 which uses three banks of pattern memory wherein each bank outputs 32 bits of data at a time.

Figure 14:
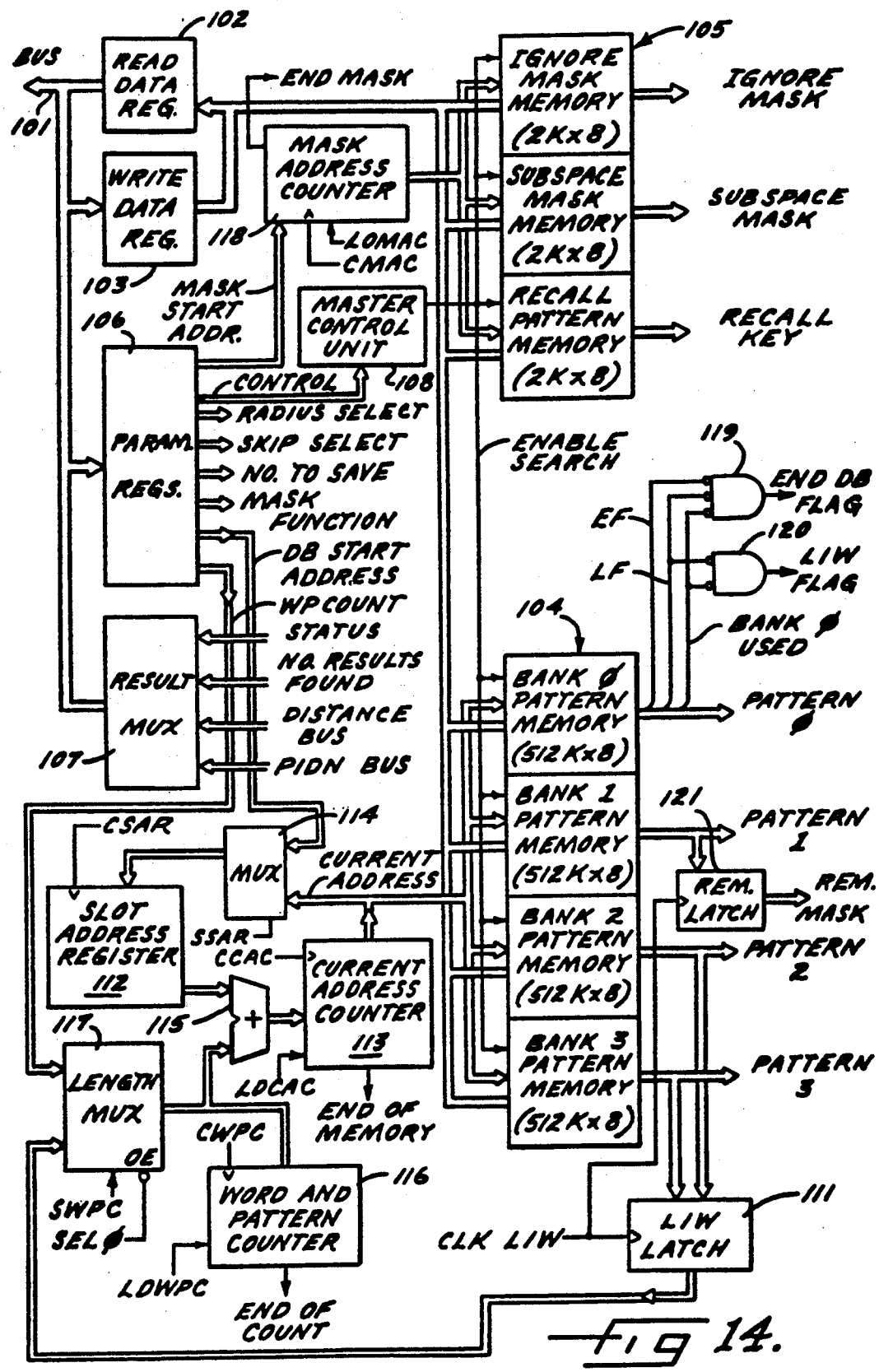
FIG. 14 is a schematic diagram showing the bus interface, master control, registers and data base memory for a specific embodiment of the invention corresponding to the third embodiment introduced in FIG. 5.

Turning now to FIG. 14, there is shown a bus interface and the circuits associated with the memory for storing the recall and recognition patterns. The parallel associative memory is connected to a host computer via a bus 101 which is connected via a read data register 102 and a write data register 103 to recognition pattern memory 104 and memory 105 for the recall pattern and the masks. The bus 101 is a 16 bit parallel bus, and consequently the read data register and the write data register are 16 bit registers. Each of the registers 102, 103 are provided by two eight bit latches (part number 74LS373). The recognition pattern memory 104 is preferably organized as four banks of dynamic random access memory, and each bank includes 512 K bytes. This dynamic random access memory is provided, for example, by sixteen 256 K×4 DRAM chips. The memory 105 for the recall pattern and masks, however, is preferably provided by static rams including 2 K×8 RAM chip (part number 2018P) for storing the Ignore masks, another for storing the Subspace masks and another for storing the recall keys.

The read data register 102 and the write data register 103 permit the host computer to access the memory banks 104, 105 in the parallel associative memory. The host computer also exchanges information with the parallel associative memory by a set of parameter registers 106 and a result multiplexer 107. The parameter registers receive and store the mask starting address, a control command, a radius selection, a skip selection, the number of results to save, a mask function, a data base start address, and a word and pattern count. The mask start address, data base start address and word and pattern count are 16 bit values. The control command is a 6 bit value, including a dedicated bit for enabling the master control to interrupt the host computer upon completion of a current operation. The radius select includes two bits, including a first bit indicating whether the correlation is to be adjusted by the radius and a second bit indicating whether a double length radius is used. The skip select has two bits, including a first bit for skipping recognition patterns for which the distance is greater or equal to zero, and a second bit for skipping recognition patterns for which the distance is less than zero. Therefore, the parameter registers may store a total of 64 bits, and the registers can be provided by eight 8-bit latches (part number 74LS373).

The host computer may read the results of the parallel associative memory through the result multiplexer 107. Depending upon the state of two address select lines in the bus 101, the host computer receives either the status, the number of results found, the distances for the matching recognition patterns, or the pattern identification numbers of the matching recognition patterns. The result multiplexer includes, for example, eight 2×4 multiplexers (part number 74LS253).

In order to operate the parallel associative memory, the host computer sends a control command over the bus 101 to the parameter registers 106. The parallel associative memory has a master control unit 108 which responds to the control command by executing a control sequence for that command. The master control unit 108 includes a sequential state machine provided by a 2 K×8 registered PROM (part number 27S45) which is programed with a control sequence for each control command and also includes the state register for the master control. This PROM, in other words, stores the present-state, next-state table for the master control unit. In addition to the PROM, the master control includes four program array logic chips (PAL part number 22V10) which also has combinational logic for relating the outputs and inputs of the master control to its present-state and next-state.

Depending upon the control command, the master control unit either enables the host computer to access the memory banks 104, 105, sends a memory command to a memory and accumulator control unit (109 in FIG. 15) to address selected patterns in the pattern memory 104 and transmit them to the host computer, or to transmit a memory command to the memory and accumulator control (109 in FIG. 15) and simultaneously transmit a sort command to a sorter control unit (110 in FIG. 19) in order for the parallel associative memory to find a selected number of the best matches and to transmit the pattern identification numbers (PIDN) of the matching recognition patterns to the host computer.

The memory and accumulator control unit (109 of FIG. 15) and the sorter control unit (110 of FIG. 19) are independent sequential state machines, each of which has a number of program array logic chips (part number 22V10). The memory and accumulator control unit causes the pattern slots in the recognition pattern memory 104 to be sequentially addressed, and operates accumulator circuits to compute a distance for each of the addressed recognition patterns. But the addressing and computation may be terminated before addressing of the entire pattern slot, as indicated by a SKIP SLOT signal.

When the computation is completed for a particular pattern slot, the memory and accumulator control unit 109 sends a MASK REM signal to the sorter control unit 110. In response, the sorter control unit 110 receives the distance values for the four different patterns in the pattern slot and selects and sorts these patterns with the previously selected and sorted patterns. If the selecting and sorting for a pattern slot are not completed by the time that the distances for the patterns in the next pattern slot have been computed, the memory and accumulator control unit 109 is inhibited by a PAUSE signal from the sorter control unit 110. In this manner the sorter will not receive distance data at a rate faster than the data can be selected and sorted.

In order to permit a slot of recognition patterns to be immediately skipped in response to the SKIP SLOT signal, the addressing circuits of FIG. 14 include means for computing the address of a next one of the patterns by adding a current pattern length to the address of a current one of the pattern. The current length is stored in a LIW latch 111 which is clocked when a LIW word is read out of banks 2 and 3 of the pattern memory 104. The LIW latch 111, for example, includes two 8-bit registers (part number 74LS374). The address of a current one of the patterns is stored in a slot address register 112. The slot address register 112 can receive the slot address either from the parameter register 106 or from a current address counter 113. The selection is performed by a multiplexer 114. The multiplexer 114 and slot address register 112 can be included in the same integrated circuits. Preferably these circuits include five 4×2 multiplexed D flip-flops (part number 74LS298). The current address counter 113 provides 19 address bits and includes, for example, two 8-bit counters and one 4-bit counter (part numbers 74AS869 and 74LS169).

In order to add the current length to the current slot address, there is provided a 19-bit adder 115 which may comprise five 4-bit adders (part number 74LS283). The sum is loaded into the current address counter 113 when a slot is skipped. The adder 115 can also be used in order to skip a number of slots so that the host computer can address the next Nth slot in the pattern memory. In order to count the number of words or patterns that are addressed, there is provided a word and pattern counter 116, which is preferably a 16-bit counter made up of two 8-bit counters (part number 74AS869). The word and pattern counter 117 can be loaded either with the current length from the LIW latch 111 or with a WP count provided from the parameter registers 106. The selection is made by a length multiplexer 117, which includes four 4×2 multiplexers (part number 74LS157).

When the current address counter 113 sequentially addresses the recognition pattern memory 104, a mask address counter 118 simultaneously addresses corresponding byte addresses of a selected recall pattern and masks in the recall pattern and mask memory 105. The mask address counter 118 provides eleven address bits and includes an 8-bit counter and a 4-bit counter (part numbers 74AS869 and 74LS169).

As the recognition patterns are read from the recognition pattern memory 104, the end of the data base is detected by a gate 119. Similarly, the presence of a length identifier word is detected by a gate 120. The remainder mask is received in a remainder latch 121 from bank 1 of the recognition pattern memory 104. The remainder latch 121 is an 8-bit latch (part number 74LS374).

Figure 15:
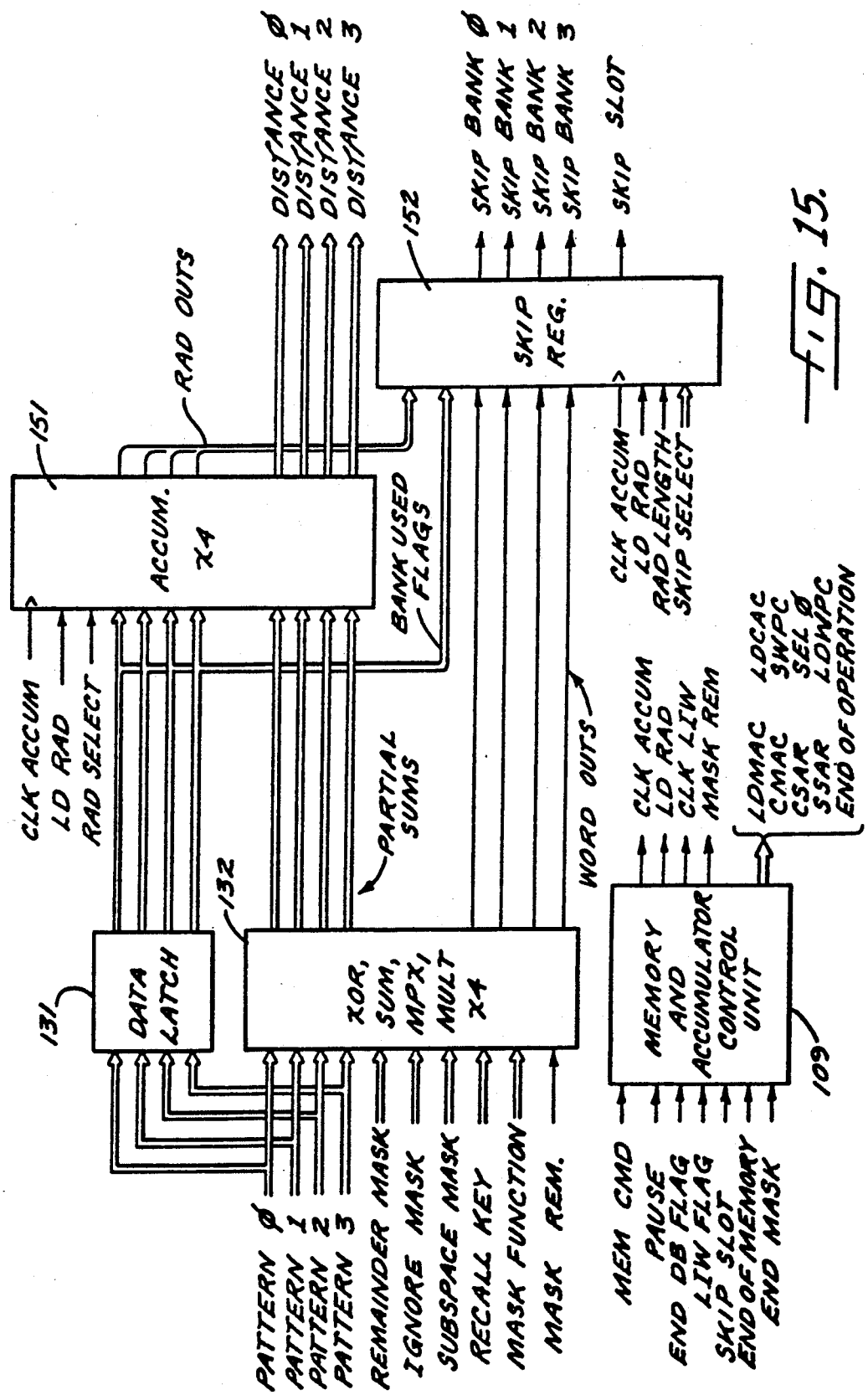
FIG. 15 is a schematic diagram showing comparator and accumulator circuits for use in the specific embodiment introduced in FIG. 14.

Turning now to FIG. 15, there are shown the comparison, accumulator and skip circuits. The radius of attraction parameters (R) and the bank used flags are temporarily stored in a data latch 131 including four 8-bit latches (part number 74LS374). In order to compare the recall key with the recognition patterns, there is provided a circuit 132 which may include eight program array logic chips (part number 22V10). The preferred logical functions are shown in FIG. 16.

Figures 16, 17:
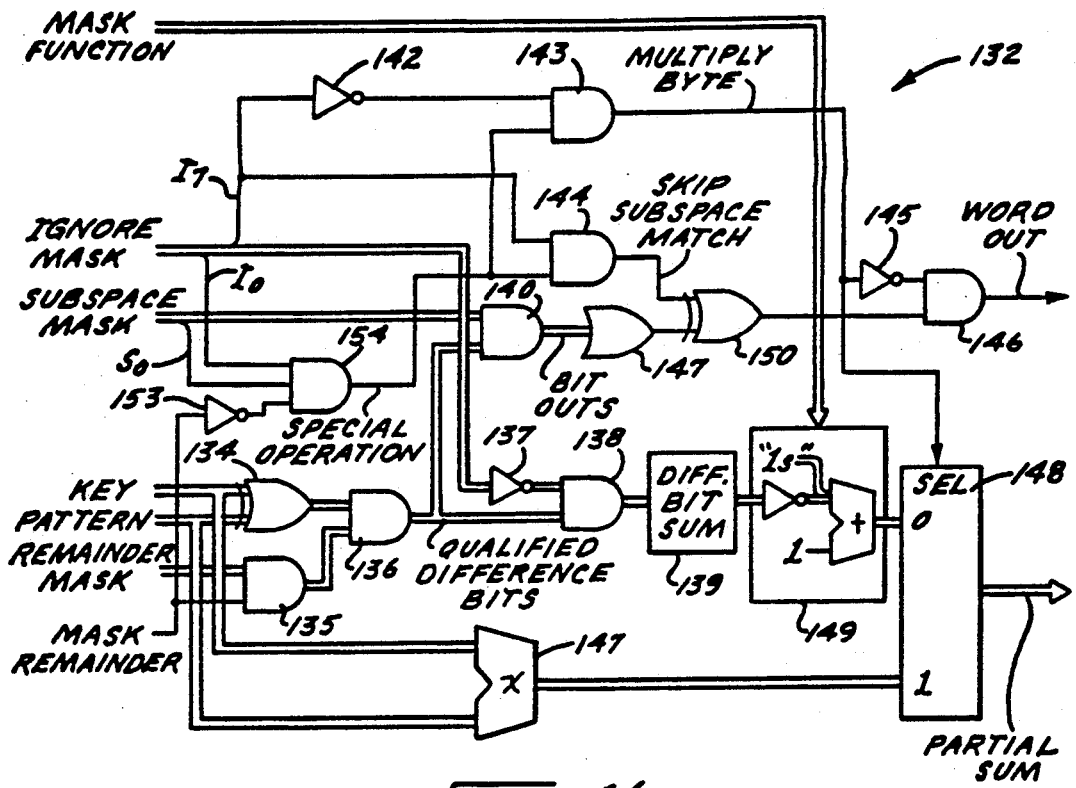
FIG. 16 is a detailed schematic diagram illustrating the comparator circuits of FIG. 15.
FIG. 17 is a table illustrating how an "Ignore Mask" and a "Subspace Mask" control various functions of the comparator circuits of FIG. 16.

Turning now to FIG. 16, difference bits are computed by the Exclusive-OR 134 of the recall key and each recognition pattern. An AND gate 135 qualifies the Remainder mask with a "MASK REM" signal indicating that the end of the pattern has been reached. In an AND gate 136, the qualified mask qualifies the difference bits from the Exclusive-OR gate 134. The qualified bits are further masked by the logical AND 138 with the complement of the Ignore mask, provided by an inverter 137. The total number of the masked difference bits is computed by a difference bit summing circuit 139 which is provided, for example, by a 512×4 bit PROM (part number 27S138).

In order to detect when a pattern should be rejected due to a mismatch of a portion designated by the Subspace mask, the mismatching bits are detected by the logical AND 140 of the qualified difference bits and the Subspace mask. A logical OR 141 detects whether there is a bit mismatch in any of the bit positions designated by the Subspace mask.

It is desirable to perform a byte-wise comparison by multiplication as well as a bit-wise comparison. The selection can be designated by the combination of the Ignore mask and the Subspace mask as indicated in FIG. 17. The particular comparison operations which are performed are determined by the specific logic in FIG. 16. For some applications it may be desirable to perform a variety of other comparison operations. The alternative operations could be selected by the MASK FUNCTION. The MASK FUNCTION might be used, for example, for rejecting recognition patterns which have a length different from the length of the recall key.

For the circuit of FIG. 16, a bit-wise comparison will result in the decrementing of an accumulated sum if there is a bit mismatch between the recall key and the recognition pattern. A designated bit is compared in this fashion if its corresponding ignore mask bit is a zero and its corresponding subspace mask is also zero. If the corresponding Ignore mask bit is a zero and the corresponding Subspace mask bit is a one, then the entire recognition pattern is rejected if there is a bit mismatch between the recall key and the recognition pattern. If the corresponding Ignore mask bit is a one and the Subspace mask bit is a zero, then nothing is done if there is a bit mismatch between the recall key and the recognition pattern.

If the least significant bit ($I_0$) of a byte of the Ignore mask bit is a one and the least significant bit ($S_0$) of a corresponding byte of the Subspace mask bit is a one, then a special operation is designated. For the circuit if FIG. 16, the byte-wise multiplication is such a special operation, and a "skip subspace match" for the byte is also such a special operation. The byte-wise multiplication is selected by an inverter 142 and logical AND 143 as the special operation when the most significant Ignore mask bit ($I_7$) is a logical zero; otherwise the skip subspace match is selected by a logical AND 144. An inverter 153 and a logical AND 154 signal a special operation when the Subspace mask bit $S_0$ is a one, the Ignore mask bit $I_0$ is a one, and the MASK REMAINDER signal is low.

When the "multiply byte" function is detected, it is assumed that an entire byte of the recall key is to be multiplied with an entire byte of the recognition pattern. Any "WORD OUT" for the byte is inhibited by an inverter 145 and a logical AND 146. The actual multiplication is performed by an 8-bit multiplier 147. In response to the MULTIPLY BYTE signal, a multiplexer 148 selects either the difference bit sum from the difference bit summer 139 or the product from the multiplier 147 as the partial sum for the current byte of the recognition pattern. The multiplier 147 could be a 64 K word memory storing a multiplication table. If the parallel associative memory were integrated, however, it would be preferable to use a pipeline multiplier.

It should be entirely permissible to combine bit data and byte data in a single pattern. There is a question, however, of how the bit data is to be weighted with respect to the byte data. As shown in FIG. 16, it is assumed that the best way to combine the bit data with the byte data is to accumulate the multiplication products as signed integer numbers, and to accumulate the difference bits as minus the number of difference bits. Therefore, each bit mismatch between the recall key and the recognition pattern will decrement the accumulated sum. A byte-wise multiplication may either increase or decrease the accumulated sum. However, the mask function could be used to select how difference bits are to affect the accumulated sum of bit products. For example, one particular value of the mask function could cause the twos complement of the number of difference bits to be calculated, as shown by the twos complement circuit 149. Alternatively, the mask function could cause the twos complement result to be left shifted by a specified number of binary places in order to selectively adjust the weighting of the bit differences with respect to the byte products.

The "skip subspace match" special operation could be used to perform the previously described search for the nearest neighbors of a different class. In this case a byte-size tag containing a class identification number should be appended to each prototype stored in the data base. The nearest neighbors for the same class would be searched by placing a subspace mask over the byte position of the class identification numbers, and by placing the desired class identification number in the corresponding position of the recall key. The nearest neighbors of different classes would then be searched by setting the Ignore mask bits in the corresponding byte of the Ignore mask. An Exclusive-OR 150 inverts the WORD OUT signal so that what was previously included (only the same class) becomes excluded.

Returning now to FIG. 15, the partial sums are accumulated in respective accumulators 151. Each accumulator includes a binary adder (such as part number 74F283) plus program array logic (part number 22V10) which provide a counter for counting the carry out of the binary adder, the accumulator register, and logic for selectively loading in the radius of attraction. RAD OUTS signals are derived from the sign bit of the accumulated values and are fed to skip register circuits 152. The skip register circuits 152 generate skip bank signals if the respective bank used flags are not set, or, depending upon the skip selection indicated by the SKIP SELECT parameter when a respective word out occurs or depending upon whether the accumulated distance is positive or negative. The skip register circuits 152 also generate a SKIP SLOT signal if all four banks are to be skipped. The skip register circuits receive the RAD LENGTH signal in order to ignore any WORD OUTS which occur when the RAD LENGTH signal is high. The skip register circuits can be provided by a single program array logic chips (part number 22V10).

Figure 18:
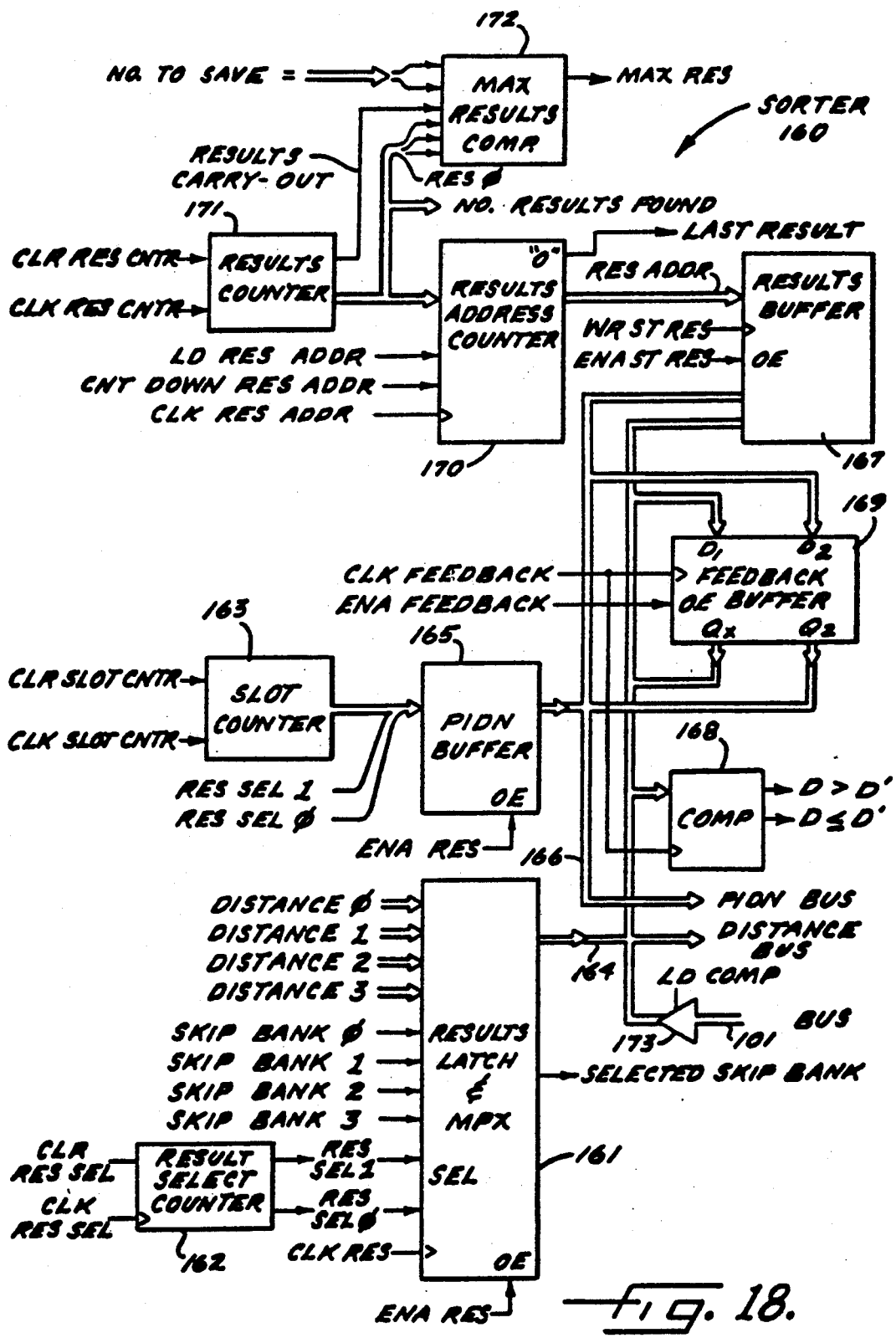
FIG. 18 is a schematic diagram of a sorter used in the specific embodiment introduced in FIG. 14.

Turning now to FIG. 18, there is shown a schematic diagram of a sorter circuit 160 which selects the recognition patterns which are not skipped and sorts them according to their respective distances. The sorter has a results latch and multiplexer 161 which has inputs receiving the respective distances for the four recognition patterns which are contemporaneously read out of respective ones of the four memory banks (104 in FIG. 14). The results latch 161 also receives skip flags which indicate whether the sorter is to ignore respective ones of the recognition patterns. When the results latch is clocked, all four distances from the accumulator (151 in FIG. 15) and their respective skip flags from the skip register (152 in FIG. 15) are stored in the results latch 161. The results latch 161 has a multiplexing tristate output which when enabled transmits a selected one of the distances and its respective skip flag. The select inputs of the results latch and multiplexer 161 are controlled by a result select counter 162.

In general, when the results latch and multiplexer 161 is clocked, the result select counter 162 is cleared. The selected skip bank flag is inspected and if it is a logical one, then the result select counter 162 is clocked to select the next recognition pattern. Otherwise, the recognition pattern is sorted based on the current distance, and when the sorting is complete, the result select counter is clocked to select the next recognition pattern. This sequence continues until all four distance measurements have been skipped or sorted. Then, the results latch is clocked and the result select counter is cleared to process the next group of four distance measurements. The results latch and multiplexer 161 includes, for example, 8 delay flip-flops (part number 74F374) enabled by a 2-bit decoder (part number 74F139). The result select counter 162, for example, is a 4-bit counter (part number 74S169).

When a recognition pattern is selected for sorting, its respective distance value is tagged with a respective pattern identification number (PIDN) which is formed by appending the result select number of the result select counter 162 to a slot number provided by a slot counter 163. The slot counter, for example, includes two 8-bit counters (part number 74AS869). When the results latch and multiplexer 161 is enabled to assert a selected distance valued on a distance bus 164, a PIDN buffer 165 is enabled to assert the corresponding pattern identification number on a PIDN bus 166. During the sorting process, as further described below, the distance values and their respective pattern identification numbers are stored together in a results buffer 167. The size of the results buffer determines the maximum number of recognition patterns that can be sorted. The results buffer, for example, may store the pattern identification numbers and distances for up to sixteen recognition patterns. In this case the results buffer 167 may comprise four 16×8 register files (part No. 74AS870).

During the sorting process, the distance for a new recognition pattern transmitted from the results latch 161 is compared to at least any minimum distance previously stored in the results buffer 167. A copy of the minimum distance is stored in a comparator 168 which does the comparison. The comparator 168, for example, includes two 8-bit comparators (part number 74AS885). If the new distance is found to be greater than a distance previously stored in the results buffer, then the previous distance in the results buffer is moved to provide a space for inserting a new distance. In order to move the previously stored distance and its respective pattern identification number, there is provided a feedback buffer 169 which may receive a distance value and its respective pattern identification number from a first location in the results buffer, and then write this distance and respective pattern identification number back to a different location in the results buffer 167. The feedback buffer 169, for example, includes four 8-bit delay flip-flops (part number 74LS374).

In order to provide the address of the result buffer from which a distance and its respective pattern identification number are read or written, there is provided a results address counter 170 which provides a result address (RES ADDR). During the sorting procedure, as further described below, it is necessary to selectively increment the results address counter, decrement the results address counter, or preset the results address counter to the number of valid PIDN, distance entries being stored in the results buffer 167. The number of valid entries being stored in the results buffer is indicated by a results counter 171. The results counter 171 and the results address counter 170 are, for example, 4-bit binary counters (part number 74LS169). At the end of a search through the pattern data base, the results counter indicates the number of results that are found and stored in the results buffer 167.

Due to the limited size of the results buffer, it is possible for more results to be selected for sorting than can be stored in the results buffer. Therefore, it is necessary in the sorting procedure to determine when the results buffer becomes full. Also, in order to speed up the search process, it is sometimes desirable to store in the results buffer a selected number of results which is less than the maximum number that could be stored in the results buffer. Therefore, to determine whether either the maximum or a lesser selected number of results are stored in the results buffer 167, there is provided a maximum results comparator 172 which compares the value from the results counter 171 to a preselected value. In order to simplify the maximum results comparator 172, it can be assumed that the number of results to save is either three, five, nine or sixteen. Therefore, the number to save can be specified by a 2-bit binary number and the maximum results comparator 172 can e provided by a 2×4 multiplexer (part number 74LS253).

Figure 19:
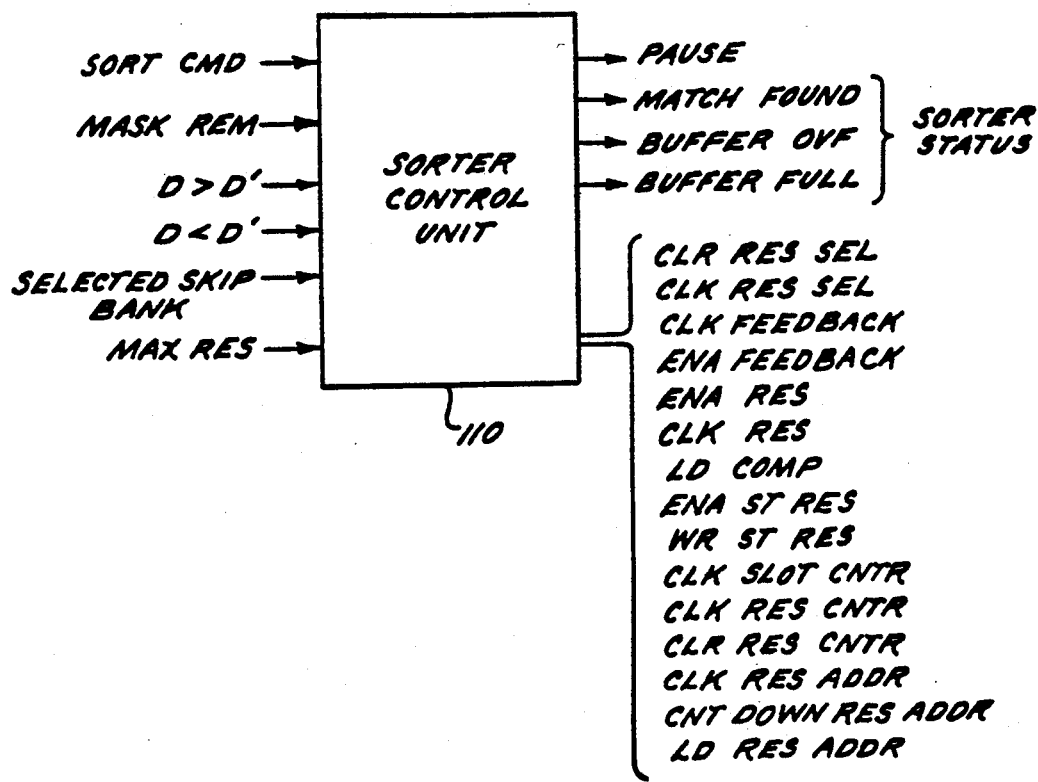
FIG. 19 is a diagram showing the inputs and outputs of a control unit for the sorter of FIG. 18.

The control signals for the sorter circuits in FIG. 18 are provided by the sorter control unit 110 of FIG. 19. The control logic for the sorter control unit is illustrated by the flowchart 180 shown in FIG. 20. In an initial step 181, the result counter is cleared and then in step 182 the results address counter is loaded with the cleared value of the results counter. Then, in step 184 a stop condition is tested to determine whether all of the selected data base in the pattern memory (104 in FIG. 14) has been searched. The stop condition 184 will occur, for example, if the data base is empty, or if all of the patterns in the data base are skipped due to a specified skip condition occurring for each of the patterns. This last case would require the "SKIP SLOT" signal from the skip register (152 FIG. 15) to be active for each pattern slot in the pattern memory.

If in step 184 the stop condition is not present, then in step 185 the sorter control unit checks whether new results have been received in the results latch 161. This occurs when the sorter control unit senses an active "MASK REM" signal. In this fashion the memory and accumulator control unit (109 in FIG. 15) enables the selector/sorter circuits of FIG. 18 to receive a new result. It should be noted that when the sorter control unit 110 is processing the new results, it sends an active pause signal back to the memory and accumulator control unit (109 in FIG. 15). When the sorter control unit is waiting for new results, it sends an inactive pause signal. In other words, the pause signal is a function of the state of the sorter control unit. The pause signal is active, for example, in steps 181 and 182, and is inactive during steps 184 and 185 until the new results are received in result latch.

When the results are received, in step 186 the results select counter (162 in FIG. 18) is cleared to select the result from the first pattern memory bank. Then, in step 187 the SELECTED SKIP BANK signal is tested in order to determine whether the result indicated by the result select counter should be selected and sorted. If the skip flag is not clear, then execution proceeds in order to compare the result to any results previously stored in the results buffer (167 in FIG. 18). The state of the sorter for a specific example is shown in FIGS. 21 to 45, and at step 186 in the flowchart 180, the contents of the result latch and result buffer are shown in FIG. 21. It is assumed that a distance of minus two and a PIDN of 16 are stored in the result latch, and the results buffer is empty.

In step 189 the result in the results latch indicated by the result select counter is transferred to the entry of the results buffer indicated by the results address counter. In step 190 the MAX RES signal from the maximum results comparator (172 in FIG. 18) is tested to determine whether the results buffer has already been filled with a preselected maximum number of entries. If not, then in step 191 the results counter (171 in FIG. 18) is incremented in anticipation of loading the results buffer with the new result. In step 192 the results address counter is loaded with the value of the results counter, and in step 193 the results address counter is decremented. In step 194 the feedback buffer is loaded with the entry of the results buffer indicated by the results address counter. In step 195 the results address counter is incremented and in step 196 the result select counter is compared to three to determine whether all four of the results in the results latch have been sorted. If not, the result select counter is incremental in step 197. Sorting has now been finished for the first result in the results latch. The contents of the results latch, feedback buffer and results buffer at this point are shown in FIG. 22 for the specific example. The first result is stored in the feedback buffer as well as the results buffer to aid the sorting process. Also, when the result is stored in the feedback buffer, its distance is also clocked into the comparator (168 in FIG. 18) in order to compare it to the distance of any subsequent result. The next result, for example, has a pattern identification number of 17, and a distance of 7. This next result is stored in the results latch and is indicated by the result select counter.

Sorting of the indicated result in the results latch continues in step 199. The SELECTED SKIP BANK flag is checked to determine whether this new result should be skipped. If not, then in step 200 the new result in the results latch is compared to the previous result stored in the feedback buffer. If the distance of the new result is greater than the distance of the prior result, then the prior result must be shifted from its current location in the results buffer. Therefore, in step 201 the prior result in the feedback buffer is transferred to the entry of the results buffer indicated by the results address counter. In step 202 the results address counter is decremented and the LAST RESULT flag is checked in step 202 to determine whether the top of the results buffer (result address=0) has been reached.

In the specific example, the contents of the results buffer at this point are shown in FIG. 23. The results address counter has reached the last result, and therefore execution branches back to step 189. In step 189 the indicated result in the results latch is stored at the top location of the results buffer. Execution continues through steps 190 to 194 causing both the results counter and the results address counter to point below the last entry in the results buffer as shown in FIG. 24. In step 197 a new result is indicated in the results latch, and in step 200 it is found that the distance of the new result is not greater than the distance of the previous result stored in the feedback buffer. Therefore, execution branches back to step 189 and the new result is stored in the next location of the results buffer, as shown in FIG. 25.

In steps 191 to 194 the results counter is incremented, the results address counter is set to the number of results and is decremented, and the last result in the results buffer is loaded into the feedback buffer. Then, in step 195 the result address counter is incremented and in step 197 the result select counter is incremented, so that the fourth result is indicated in the result latch, as shown in FIG. 26. In this case, when the results are compared to step 200, it is found that the distance of the new result is greater than the distance of the previous result in the feedback buffer, and therefore, after steps 201, 202 and 203, the results address counter is decremented in step 204. FIG. 27 shows the state of the results buffer at this time.

In step 205 the entry in the results buffer indicated by the results address counter is transferred to the feedback buffer in anticipation of comparing the distance of this result to the distance of the new result. Next in step 206 the results address counter is incremented in anticipation of storing the smaller of these two results at the newly indicated entry of the results buffer. The state of the results buffer at this point is shown in FIG. 28.

Execution jumps back to step 200 to compare the distance of the new result to the distance of the result in the feedback buffer. In step 200 it is found that the distance of the new result is again larger than the distance of the prior result in the feedback buffer, therefore, steps 201 to 206 are repeated. The state of the results buffer at this time is shown in FIG. 30.

Execution again jumps back to step 199, and it is found that the new result has a distance that is less than the distance of the prior result in the feedback buffer. Therefore, execution jumps to step 189 and the new result in the results latch is stored in the second entry of the results buffer. After steps 191 to 194, the results counter is decremented to below the last entry in the results buffer, and the results address counter is loaded and incremented to point to the last entry in the results buffer as shown in FIG. 31. Then, in step 194 the last entry in the results buffer is transferred to the feedback buffer, and the results address counter is incremented in step 195.

At this time, however, in step 196 the result select counter is found to be equal to three, so that the stop condition is tested in step 208, and in step 209 the sorter control unit waits until new results are received in the results latch. Then, in step 210 the slot counter is incremented and the results select counter is set to zero. A new result appears in the results latch, as shown in FIG. 32. Execution branches to step 199, and in step 200 the distance of the new result is compared to the distance of the prior result which is stored in the feedback buffer. In this case the new result has a smaller distance, so execution branches back to step 188. In step 189 the new result is stored in the last entry of the results buffer.

In the specific example of FIGS. 21-44, it is assumed for the sake of illustration that the number of maximum results is five. Therefore, in step 190 execution branches to step 211. In step 211 a MAX RESULT flag is set to indicate that the maximum number of results has been reached. If this flag is not set, the NO. OF RESULTS FOUND will indicate the number of results finally stored in the results buffer. Otherwise, the number of results finally stored will be one more than the NO. OF RESULTS FOUND.

Figures 33, 44:
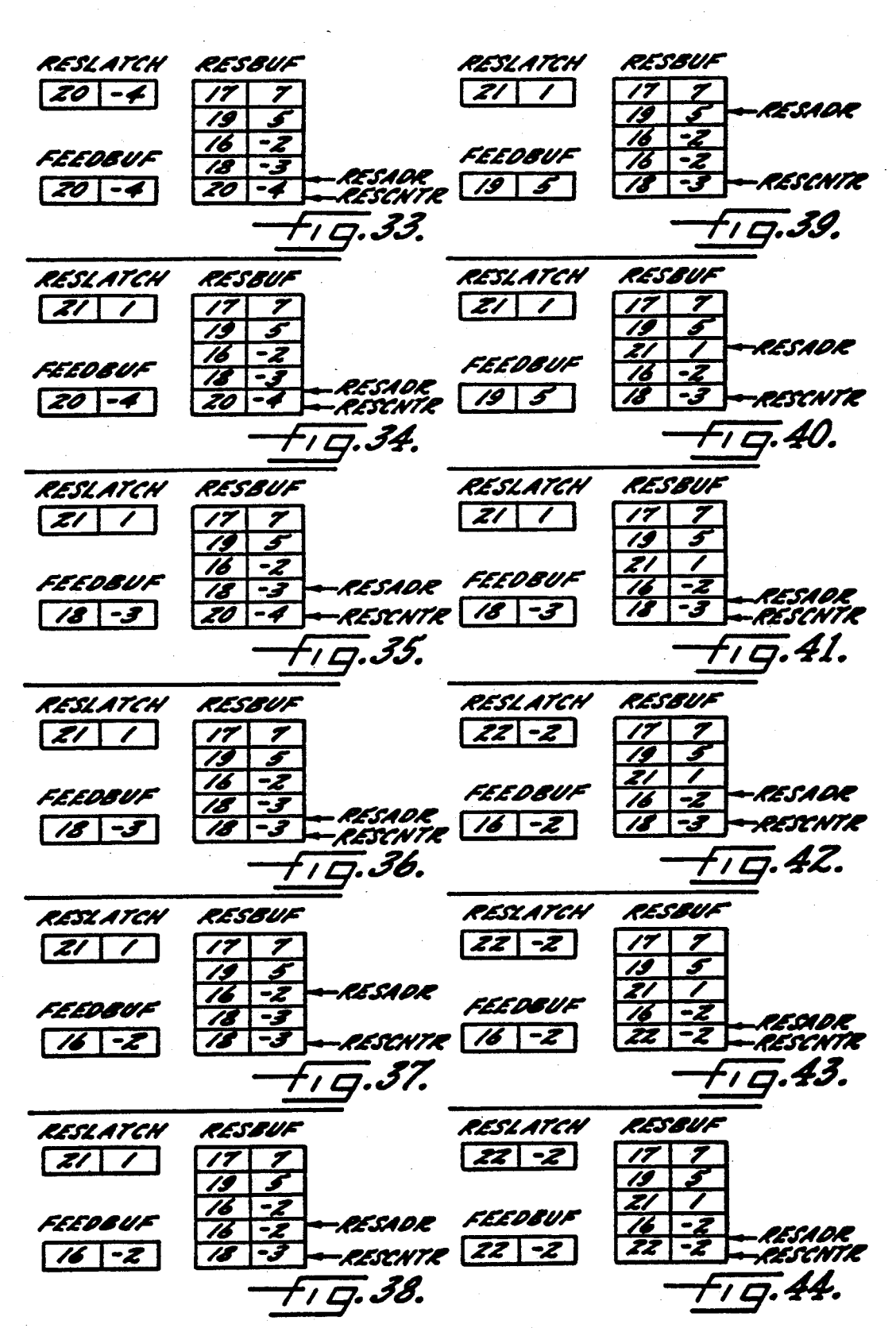

In step 212, the results address counter is loaded with the value of the results counter, which in this case does not cause the result address to change. Next, in step 213 the feedback buffer is loaded with the entry of the results buffer indicated by the results address. The state of the results buffer at this point is shown in FIG. 33.

In step 214 the result select counter is incremented so that a new result is indicated in the results latch as shown in FIG. 34. After checking the SELECTED SKIP BANK in step 216, in step 217 the new result in the results latch is compared to the prior result in the feedback buffer. In this case, the distance of the result in the result latch is greater than the distance of the prior result in the feedback buffer, so that execution branches back to 204. The results address is decremented, and in step 205 the feedback buffer is loaded with the entry of the results buffer indicated by the result address. The state of the feedback buffer is shown in FIG. 35.

In step 206 the result address counter is incremented and execution jumps back to step 200 to compare the results. It is again found that the distance of the new result is greater than the distance cf the result in the feedback buffer. Therefore, step 201 is repeated, causing the value in the feedback buffer to replace the last entry in the result buffer. The last entry in the result buffer is "thrown away" as shown in FIG. 36.

In step 202 the results address counter is decremented and after step 203 the results address counter is again decremented in step 204. The state of the results buffer at this point is shown in FIG. 37. In step 205 the entry of the results buffer indicated by the result address is transferred to the feedback buffer. The state of the feedback buffer at this point is shown in FIG. 37.

In step 206 the results address counter is incremented and execution again jumps back to step 200 to compare results. It is again found that the new result has a distance that is greater than the distance of the prior result in the feedback buffer. Therefore, in step 201 the result in the feedback buffer is transferred to the entry of the results buffer indicated by the result address, as shown in FIG. 38. In step 202 the results address counter is decremented, and after step 203 the results address counter is again decremented. The state of the results buffer is at this point is shown in FIG. 40.

In step 205 the entry of the results buffer indicated by the result address is transferred to the feedback buffer, and in step 206 the results address counter is incremented. Execution again jumps back to step 200 to compare the results. At this point, however, the distance of the new result is less than the distance of the prior result in the feedback buffer. Therefore, execution jumps to step 188 and the new value indicated in the results latch is stored in the entry of the results buffer indicated by the result address. The state of the results buffer at this point is shown in FIG. 40.

Next in step 190 it is found that the maximum number of results is stored in the results buffer. Therefore, execution jumps to step 211, and in step 212 the results address counter is loaded with the value of the results counter. In step 213 the entry of the results buffer indicated by the results address is transferred to the feedback buffer. The state of the feedback buffer at this point is shown in FIG. 41. In step 214 the results select counter is incremented so that a new result is indicated in the results latch. After checking the SELECTED SKIP BANK signal in step 216, the results are compared in step 217. The new result has a distance which is greater than the distance of the prior result in the feedback buffer, so execution jumps back to step 204. The results address counter is decremented, and in step 205 the entry of the results buffer indicated by the result address is transferred to the feedback buffer. The state of the feedback buffer at this point is shown in FIG. 43.

In step 206 the results address counter is incremented and execution jumps back to step 200 to compare the results. At this point the distances of the results are found to be equal, so execution jumps to step 189. In step 189 the indicated result in the results latch is transferred to the entry of the results buffer indicated by the result address. The state of the results buffer at this point is shown in FIG. 44.

In step 190 it is again found that the result buffer is storing the maximum number of results. Therefore, execution jumps to 211 and in step 213 the last entry in the results buffer is transferred to the feedback buffer. The final state of the feedback buffer at this point is shown in FIG. 44. This completes the description of the specific example of FIGS. 21 to 44. It should be noted, however, that if further results were processed, eventually in step 218 it would be found that the result select would become equal to three. In this case, in step 220, the sorter control would wait for new results to be received in the results latch, and once they were received the results select counter would be set equal to zero in step 221. Thereafter, execution would proceed to step 216.

Figure 20:
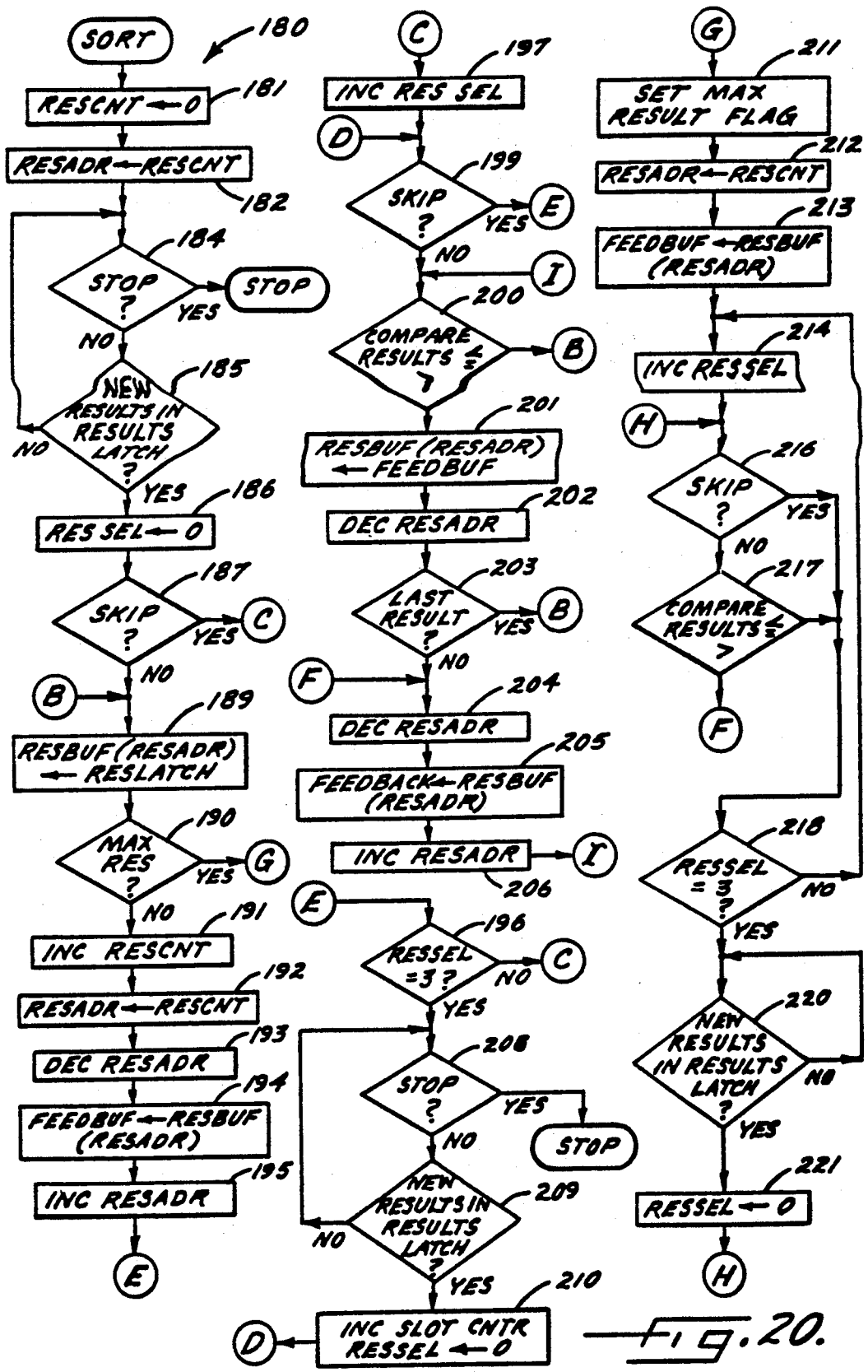
FIG. 20 is a flowchart defining control logic used in the sorter control unit of FIG. 19 for selecting and sorting up to a certain number of recognition patterns which match a specified recall pattern.

The sorter control unit of FIG. 19 executes the sorting control procedure of FIG. 20 in response to a "Search N" command from the sorter control unit of FIG. 19. The sorter control unit recognizes a number of other commands, including a command to stop a searching operation. A "Clear Sorter" command, for example, is typically used at the end of the search operation in order to set the word counter 163 to 0, to set the result select counter 162 to zero, to set the results address counter 170 to zero, to set the results counter 171 to zero and to output the first result in the results buffer to the distance bus and the PIDN bus (see FIG. 18). Therefore, the host computer may obtain the first results from the result multiplexer (107 in FIG. 14).

In order to transmit the other results, the master control units sends an "Enable Next Result" command to the sorter control unit. In response to the "Enable Next Result" command, the sorter control unit increments the results address counter and enables the next result to be transmitted from the results buffer to the distance bus and the PIDN bus.

The sorting procedure of FIG. 20 is used when searching for a certain number of the recognition patterns that are nearest to a recall pattern. Sometimes it is desirable to find all of the recognition patterns which are within a certain distance from the recall pattern. For performing such a search, the master control unit first sends a "Load Distance Constraint" command to the sorter control unit (110 in FIG. 19). In response, the sorter control unit enables a gate (173 in FIG. 18) to transfer the distance constraint from the bus 101 (FIG. 18) to the distance bus (164 in FIG. 18) and to clock the comparator (168) to receive the distance constraint. It is also possible to load the comparator without the use of the gate 173 by successively transferring the distance constraint through the write data register (103 in FIG. 14), the pattern memory (104 in FIG. 14), the data latch (131 in FIG. 15), the accumulator (151 in FIG. 15), and the results latch (161 in FIG. 18).

Figure 45:
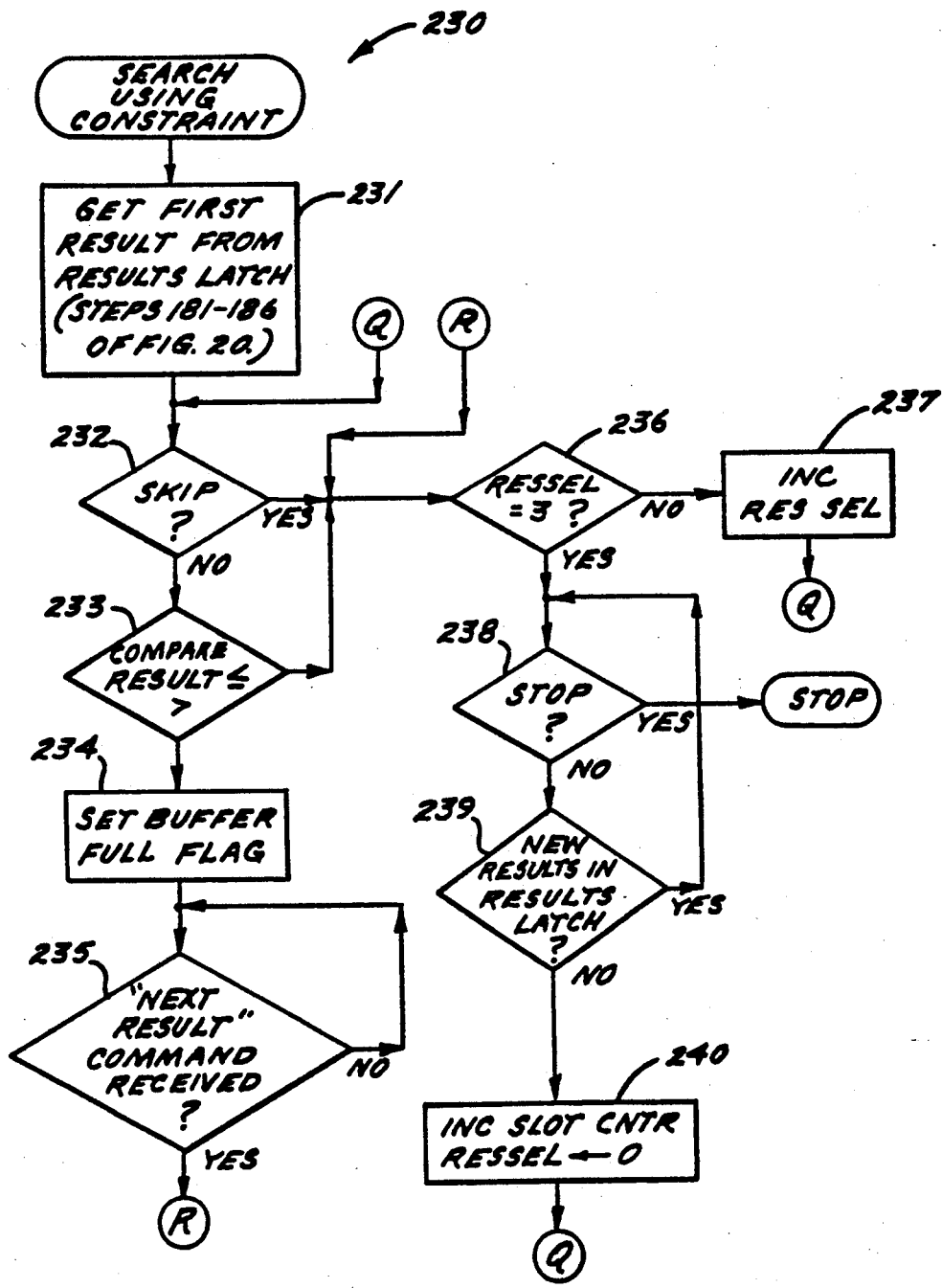
FIG. 45 is a flowchart defining control logic used in the sorter control unit of FIG. 19 for selecting all of the recognition patterns which lie within a specified distance from a specified recall pattern.

Once the distance constraint is loaded into comparator, the master control unit sends a "Search All Within Distance" command to the sorter control unit (110 in FIG. 19) which causes the sorter control unit to execute the search procedure illustrated by the flowchart 230 in FIG. 45. In the first step generally designated 231, the first result is obtained from the results latch in the manner defined by the steps 181 to 186 of FIG. 20. Then, in step 232, the "Selected Skip Bank" signal is tested to determine whether the first result should be skipped. If not, then in step 233 the distance of the result is compared to the distance constraint having been loaded in the comparator. If the distance of the result is greater than the distance constraint, then in step 234 a buffer full flag is set to signal the host computer, via the "STATUS" fed to the result multiplexer (107 in FIG. 14), that the next result has been found. The host computer may then read the distance and PIDN of this next result from the distance bus and the PIDN bus.

In step 235, the sorter control unit waits for a "Next Result" command before proceeding. When a "Next Result" command is received, the result select counter is tested in step 236 to determine whether the third result is selected. If not, the result select counter is incremented in step 237 and execution loops back to step 232 to test the next result. Otherwise, a set of new results must be obtained from the results latch.

Therefore in step 238 the stop condition is tested, and in step 239 the sorter control unit checks whether new results have been received in the results latch. If not, execution loops back to step 238. If new results are received before a stop command is received by the sorter control unit, then in step 240 the slot counter is incremented and the result selected counter is set equal to zero before testing for the new results starts in step 232.

For the search using the distance constraint, step 233 rejects those results having a distance less than or equal to the specified distance constraint. For some applications, it is desirable to obtain each and every result which is not to be skipped. To obtain all of these results, the master control unit send a "Search All" command to the sorter control unit. In response to this command, the sorter control unit executes the search procedure of FIG. 45, but does not perform the comparison of step 233; instead, if in step 232 the "Selected Skip Bank" signal does not indicate a skip, then execution continues in step 234. The "Search All" command could be used, for example, to obtain the correlation or vector scalar product of a specified recall pattern vector with each of the recognition pattern vectors. The "Search All" command could also be useful for obtaining all of the recognition patterns which are included in a subspace defined by the subspace mask.

In addition to selecting or sorting results, the slot counter 163 in the sorter is also used to count slots during certain memory operations in order to indicate which slot the host computer may access directly through the read data register 102 or write data register 103. For this purpose, the master control unit sends a "Increment Slot Counter" command to the sorter control unit.

Turning now to FIG. 46, there is shown a flowchart generally designated 250 of a procedure executed by the master control unit (118 in FIG. 14) in response to a search command from the host computer. In a first step 251, the master control unit sends a "Load Data Base Start Address" command to the memory control unit (109 in FIG. 15). Then, in step 252, the master control unit sends a search command to the memory control unit, and also sends a search command to the sorter control unit (110 in FIG. 19). Then, in step 253, the master control unit waits for an end of operation signal from the memory control unit. Once the end of operation signal is received, in step 254 the master control unit sends a stop or "Clear Sorter" command to the sorter control unit.

FIG. 47A shows half of a flowchart generally designated 260 which is executed by the memory control unit (109 in FIG. 15) in response to a memory command from the master control unit (108 in FIG. 14). In a first step 261, execution branches to a state dependent upon the specific memory command. For a "Load Data Base Start Address" command, execution branches to step 262 wherein the sorter control unit operates the multiplexer 114 and clocks the slot address register 112 (FIG. 14) so that the Data Base Start Address is loaded into the slot address register. For a search command, execution branches to step 263 in which the current address counter (113) is loaded from the slot address register with a zero output selected from the length multiplexer 117. Then, in step 264 the length multiplexer 117 is switched and the current length is loaded into the word and pattern counter 116.

To read and process a new slot of data, in step 265 the pattern and mask memories 104 and 105 for the current address and the mask address are read. Then, in step 266 execution branches if end of memory is reached. In this case, in step 267 an end of operation signal is sent to the master control unit. Similarly, if the end of data base is reached as tested in step 258, the end of operation signal is also sent. As is seen in FIG. 14, the end of memory signal is the carry out of the current address counter 113 or the mask address counter 118, and the end of data base signal is indicated by an end of data base flag from a gate 119. Next, in step 269 the LIW flag is tested to determine whether the pattern of data read from memory includes a LIW word. If so, then in step 270 the LIW latch 111 is loaded with the LIW word, the mask address counter 118 is loaded with the mask start address, the word and pattern counter 116 is loaded with the current length, and the current address counter 113 is incremented. Then, execution jumps back to step 265 to read the next word of data from the memories.

Figure 47B:
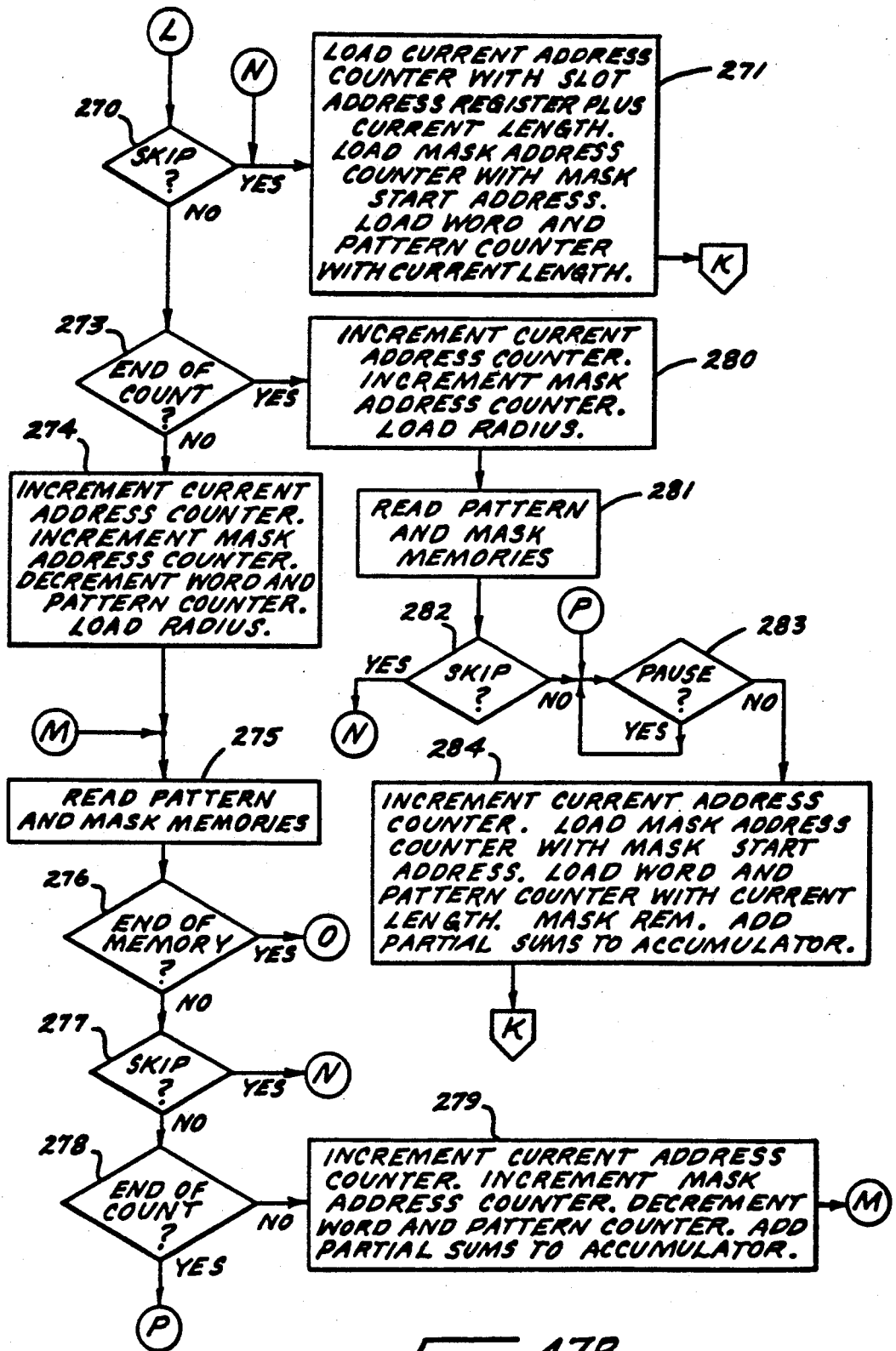

If a LIW word is not found in step 269, then execution continues in FIG. 47B. In step 270 the SKIP SLOT signal is tested to determine whether all of the words for the current slot of patterns should be skipped. If so, then in step 271 the current address counter 113 is loaded with the sum of the value of the slot address register 112 and the current length. Also, the mask address counter 118 is loaded with the mask starting address. In addition, the word and pattern counter is loaded with the current length.

If a skip is not detected in step 270, then an end of count is tested in step 273. If an end of count does not occur, then processing of the current slot of patterns continues in step 274. The current address counter is incremented, the mask address counter is incremented, and the word and pattern counter is decremented. Also, since at this point the first word for the patterns is read from the memories, the radius is transferred through the data latch 131 and loaded into the accumulator 151 (see FIG. 15). Then, in step 275 the next word of data is read from the pattern and mask memories.

In step 276 the carry outs of the current address counter 113 and the mask address counter 118 are tested to determine if end of memory has been reached. If so, then execution jumps back to step 267 of FIG. 47A to send an end of operation signal to the master control unit. Otherwise, in step 277 the SKIP SLOT signal is tested and execution jumps to step 271 if a skip is indicated. Otherwise, in step 278 the carry out from the word and pattern counter is tested to determine if the end of count has been reached. If not, then in step 279 the current address is incremented, the mask address counter is incremented, and the word and pattern counter is decremented. The partial sums computed for the bytes of the current word is added to the accumulator registers, and then execution jumps back to step 275 to read the pattern and mask data for the next word.

If an end of count is detected in step 273, then the current word is the first word of the current patterns, and the patterns will only have one additional word. The first word includes the radius. Therefore, in step 280 the current address counter is incremented, the mask address is incremented, and the radius is transferred through the data latch 131 and loaded into the accumulator 151. Then in step 281 the pattern and mask memories are read to obtain the last word of data for the patterns, and in step 282 the "SKIP SLOT" signal is tested to determine whether the current slot of patterns should be skipped. If not, then all of the data for the current slot of patterns will be processed at the end of the current cycle. However, the sorter may not be ready to accept the new results. Therefore, in step 283 the pause signal from the sorter is tested until the sorter is ready to receive the new data.

When the sorter is ready to receive the new data, the new data is computed and transmitted in step 284. Specifically, in anticipation of the next memory read, the current address counter is incremented, the mask address counter is loaded with the mask start address, and the word and pattern counter is loaded with the current length. The MASK REM signal is transmitted for processing of the last word of pattern data, and to signal the sorter to receive the new results. The new results are computed by adding the last partial sums to the accumulator registers. Execution then jumps to step 265 in FIG. 47A to read the pattern and mask memories to obtain a word of data for the next slot of patterns. This completes the description of the procedure executed by the memory and accumulator control unit.

The parallel associative memory of the present invention has a number of advantages over the recognition systems and associative memories already known. One of the prime advantages of the parallel associative memory of the present invention is the elegance of its design. The use of an ordinary RAM with modifications, either internal or external to the RAM, in a parallel architecture, provides for easy upgrades, significant performance improvement over the use of general purpose processors, and most of all provides low cost fast pattern matching or fast data retrieval. Patterns of various sizes can be stored in the memory, and the Subspace and Ignore Masks permit domain specific knowledge to be considered or ignored during the search. The invention provides fast processing without narrowing the field of applications for the recognition system. It also provides fast data retrieval for exact or inexact matches for a data pattern compared to the contents of the memory. At the same time, since the parallel associative memory of the present invention is designed to be a part of a multi-tiered system, the higher tiers of the system can operate independently after proper loading of the lower tier parallel associative memory so as to carry out any other operations that are required of that upper tier.

The parallel associative memory of the present invention therefore provides flexibility for applications and speed for identification of observed patterns with prescribed recognition patterns while existing recognition pattern systems and associative memories fail to provide this combination of speed and wide range of applicability.

What is claimed is:

1. A method of recognizing patterns, said method comprising the steps of:
   storing a plurality of recognition patterns in at least one memory, and storing in said memory respective parameters defining respective radii of attraction for the recognition patterns;
   receiving a recall pattern;
   comparing certain bits of said recall pattern to certain bits of said plurality of recognition patterns and rejecting certain of the recognition patterns based on the bit-wise comparison;
   correlating said recall pattern with at least said plurality of recognition patterns in said memory which are not rejected to determine respective measures of closeness for the recognition patterns which are not rejected, wherein said correlating includes adjusting the respective correlations by the respective parameters to determine the respective measure of closeness for the recognition patterns which are not rejected; and
   inspecting said measures of closeness to identify at least one closest one of the recognition patterns which are not rejected.

2. The method as claimed in claim 1, wherein said recall pattern and said recognition patterns include respective vector portions distinct from said bits, and wherein said correlating is performed by computing respective scalar products of the vector portion of said recall pattern and the vector portions of the respective recognition patterns which are not rejected.

3. The method as claimed in claim 1, wherein said certain bits are designated by at least one mask.

4. A parallel associative memory, comprising:
   means for inputting a recall pattern;
   a plurality of associative memories, each associative memory comprising:
      means for storing a plurality of recognition patterns,
      means for receiving said recall pattern from said means for inputting, and
      means for outputting an indication of at least one recognition pattern that closely matches said recall pattern from said plurality of recognition patterns in said means for storing;
   means for selecting at least one recognition pattern that most closely corresponds to said recall pattern indicated by the outputs of said plurality of associative memories; and
   means for outputting an indication of said at least one recognition pattern selected by said means for selecting;
   wherein each of said plurality of associative memories further comprises:
      means for comparing said recall pattern from said means for receiving to said plurality of recognition patterns in said means for storing, and
      means for selecting as the output of said means for outputting an indication of said at least one recognition pattern that closely matches said recall pattern based upon the comparison by said means for comparing; and
   wherein said means for storing a plurality of recognition patterns includes means for storing recognition patterns of different bit lengths in sequence in contiguous addressable memory locations, and wherein said means for comparing includes.

5. The parallel associative memory of claim 4, wherein said means for comparing includes means for comparing said recall pattern to end portions of said recognition patterns, said end portions having the same bit lengths as the bit length of said recall pattern.

6. A parallel associative memory, comprising:
   means for receiving a recall pattern;
   a plurality of addressable memory means for storing and recalling a plurality of recognition patterns at respective addresses;
   means for addressing said addressable memory means to contemporaneously recall a sequence of said stored recognition patterns from each of said addressable memory means;
   means for contemporaneously comparing said recall pattern to the recognition patterns recalled from each of said addressable memory means;
   means for selecting at least one recognition pattern that closely matches said recall pattern based upon the comparison by said means for comparing; and
   means for outputting an indication of at least one recognition pattern selected by said means for selecting, wherein said addressable memory means include means for storing and recalling recognition patterns of different lengths in sequence in contiguous addressable memory locations, and wherein said means for contemporaneously comparing includes means for comparing said recall pattern from said means for receiving to recognition patterns of different lengths.

7. The parallel associative memory as claimed in claim 6, wherein said addressable memory means includes means for storing information specifying the different lengths of the recognition patterns, and said means for addressing includes means for computing the address of a next one of the patterns by adding a current pattern length to the address of a current one of the patterns.

8. A parallel associative memory, comprising;
means for receiving a recall pattern;
a plurality of addressable memory means for storing and recalling a plurality of recognition patterns at respective addresses;
means for addressing said addressable memory means to contemporaneously recall a sequence of said stored recognition patterns from each of said addressable memory means;
means for contemporaneously comparing said recall pattern to the recognition patterns recalled from each of said addressable memory means;
means for selecting at least one recognition pattern that closely matches said recall pattern based upon the comparison by said means for comparing; and
means for outputting an indication of at least one recognition pattern selected by said means for selecting, wherein said addressable memory means includes means for storing and recalling a parameter defining a radius of attraction for each recognition pattern, and said means for comparing includes means for correlating the recall pattern with each recalled recognition pattern and adjusting the correlation for each recalled recognition pattern by an amount based on the respective parameter.

9. The parallel associative memory as claimed in claim 8, wherein said means for adjusting the correlation includes means for adding the correlation to the parameter defining the respective radius of attraction to compute a distance measure for each recalled recognition pattern.

10. The parallel associative memory as claimed in claim 8, wherein said recall pattern and said recognition patterns include vectors, and said correlation is computed as the vector scalar product.

11. The parallel associative memory as claimed in claim 8, wherein said recall pattern and said recognition patterns include bit strings, and said correlation is computed based on a bit-wise comparison of said bit strings.

12. The parallel associative memory as claimed in claim 11, further comprising means for monitoring the number of differences in the bit-wise comparison of said recall pattern to a given recognition pattern by said means for comparing, and means for halting said means for comparing from further comparison of said recall pattern to said given recognition pattern when the number of differences exceeds a predetermined threshold.

13. The parallel associative memory of claim 11, further comprising means for monitoring the number of differences in the bit-wise comparison of said recall pattern to a given recognition pattern; and means for halting said means for comparing from comparing said recall pattern to any recognition patterns not yet compared when the number of differences is less than a predetermined threshold.

14. The parallel associative memory as claimed in claim 11, wherein said means for comparing further includes means for receiving an "Ignore Mask" designating bit positions of the recall key for which the comparison between the recall key and each recognition pattern is ignored.

15. The parallel associative memory as claimed in claim 11, wherein said means for comparing further includes means for receiving a "Subspace Mask" designating bit positions of the recall key for which the recall key and each recognition pattern must match for the recognition pattern to be selected by said means for selecting.

16. The parallel associative memory as claimed in claim 11, wherein said means for comparing further includes a multi-bit multiplier unit for performing a vector scalar product comparison between said recall pattern and each of the recalled recognition patterns.

17. The parallel associative memory as claimed in claim 16, wherein said means for comparing further includes means for receiving at least one mask for designating some portions of said recall pattern and each recognition pattern for said bit-wise comparison, and for designating other portions of said recall pattern and each recognition pattern for said vector scalar product comparison.

18. A parallel associative memory, comprising; means for receiving a recall pattern;
a plurality of addressable memory means for storing and recalling a plurality of recognition patterns at respective addresses;
means for addressing said addressable memory means to contemporaneously recall a sequence of said stored recognition patterns from each of said addressable memory means;
means for contemporaneously comparing said recall pattern to the recognition patterns recalled from each of said addressable memory means;
means for selecting at least one recognition pattern that closely matches said recall pattern based upon the comparison by said means for comparing; and
means for outputting an indication of at least one recognition pattern selected by said means for selecting, wherein said means for comparing includes means for providing respective numerical values indicating the closeness of the recognition patterns compared to the recall pattern, and wherein said means for selecting includes means for identifying a certain number of the closest recognition patterns which are compared to the recall pattern, and means for sorting said certain number of the closest recognition patterns according to their respective numerical values indicating their closeness.

19. The parallel associative memory as claimed in claim 18, wherein said addressable memory means includes means for storing and recalling a parameter defining a radius of attraction for each recognition pattern, and said means for providing numerical values includes means for correlating the recall pattern with each recalled recognition pattern and adjusting the correlation for each recalled recognition pattern by an amount based on the respective parameter.

20. The parallel associative memory as claimed in claim 18, wherein said means for selecting includes means for rejecting recognition patterns which were compared to the recall pattern and have respective numerical values indicating that they are closer by at least a predetermined threshold value.

21. The parallel associative memory as claimed in claim 18, wherein said means for selecting includes means for rejecting recognition patterns which were compared to the recall pattern and which have respective numerical values indicating that they are further by at least a predetermined threshold value.

22. The parallel associative memory as claimed in claim 18, wherein said means for selecting includes means for rejecting recognition patterns which have portions selected by a "Subspace Mask" which fail to match corresponding portions of the recall pattern.

23. A parallel associative memory, comprising; means for receiving a recall pattern;
a plurality of addressable memory means for storing and recalling a plurality of recognition patterns at respective addresses;
means for addressing said addressable memory means to contemporaneously recall a sequence of said stored recognition patterns from each of said addressable memory means;
means for contemporaneously comparing said recall pattern to the recognition patterns recalled from each of said addressable memory means;
means for selecting at least one recognition pattern that closely matches said recall pattern based upon the comparison by said means for comparing; and
means for outputting an indication of at least one recognition pattern selected by said means for selecting, wherein:
said means for comparing includes means for providing respective numerical values indicating the closeness of the recognition patterns compared to the recall pattern,
said means for selecting includes means for identifying a certain number of the closest recognition patterns which are compared to the recall pattern, and means for sorting said certain number of the closest recognition patterns according to their respective numerical values indicating their closeness,
said addressable memory means includes means for storing and recalling a parameter defining a radius of attraction for each recognition pattern, and said means for providing numerical values includes means for correlating the recall pattern with each recalled recognition pattern and adjusting the correlation for each recalled recognition pattern by an amount based on the respective parameter, and
said means for selecting includes means for rejecting recognition patterns which have portions selected by a "Subspace Mask" which fail to match corresponding portions of the recall pattern.

24. The parallel associative memory as claimed in claim 23, wherein said means for selecting includes means for rejecting recognition patterns which were compared to the recall pattern and have respective numerical values indicating that they are closer by at least a predetermined threshold value.

* * * * *